(12) United States Patent
Singh

(10) Patent No.: US 12,005,771 B2
(45) Date of Patent: Jun. 11, 2024

(54) LIGHTWEIGHT HIGH-EFFICIENCY, HIGH TEMPERATURE ELECTRIC DRIVE SYSTEM

(71) Applicant: Deere & Company, Moline, IL (US)

(72) Inventor: Brij N. Singh, West Fargo, ND (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 18/154,598

(22) Filed: Jan. 13, 2023

(65) Prior Publication Data
US 2023/0150353 A1 May 18, 2023

Related U.S. Application Data

(62) Division of application No. 17/097,871, filed on Nov. 13, 2020, now Pat. No. 11,577,601.

(60) Provisional application No. 63/027,828, filed on May 20, 2020.

(51) Int. Cl.
| B60K 11/04 | (2006.01) |
| B60K 7/00 | (2006.01) |
| B60K 1/00 | (2006.01) |
| H02K 9/19 | (2006.01) |

(52) U.S. Cl.
CPC ............ B60K 11/04 (2013.01); B60K 7/0007 (2013.01); *B60K 2001/006* (2013.01); *F01P 2050/24* (2013.01); *H02K 9/19* (2013.01)

(58) Field of Classification Search
CPC .................................................. B60K 7/0007
See application file for complete search history.

(56) References Cited

U.S. PATENT DOCUMENTS

| 5,127,485 A | 7/1992 | Wakuta et al. |
| 5,631,821 A | 5/1997 | Muso |
| 6,678,182 B2 | 1/2004 | Joseph et al. |
| 6,964,631 B2 | 11/2005 | Moses et al. |
| 7,156,195 B2 | 1/2007 | Yamagishi et al. |

(Continued)

FOREIGN PATENT DOCUMENTS

WO 2019182622 9/2019

OTHER PUBLICATIONS

Waye et al., "Advanced Liquid Cooling for a Traction Drive Inverter Using Jet Impingement and Microfinned Enhanced Surfaces," National Renewable Energy Laboratory, May 27-30, 2014, 12 pages.

(Continued)

*Primary Examiner* — Erez Gurari
(74) *Attorney, Agent, or Firm* — Hanley, Flight & Zimmerman, LLC

(57) ABSTRACT

Lightweight high-efficiency, high temperature electric drive system is disclosed herein. An example electric drive system including an electric motor including an output shaft. The example electric drive system including power electronics electrically coupled to the electric motor, wherein the power electronic include an inverter. The example electric drive system including a gearbox coupled to the output shaft. The example electric drive system including a first heat exchanger coupled to a surface of the electric motor, the first heat exchanger including coolant. The example electric drive system including a second heat exchanger coupled to a surface of the power electronics, the second heat exchanger including the coolant.

20 Claims, 13 Drawing Sheets

(56) References Cited

U.S. PATENT DOCUMENTS

| | | | |
|---|---|---|---|
| 8,018,103 B2 | 9/2011 | Yoshida et al. | |
| 8,080,909 B2 | 12/2011 | Perkins | |
| 10,717,366 B1* | 7/2020 | Jaksic | H02M 7/5387 |
| 2004/0124722 A1 | 7/2004 | Uchida et al. | |
| 2004/0134693 A1 | 7/2004 | Yamagishi et al. | |
| 2004/0163409 A1* | 8/2004 | Nakajima | B60L 3/003 |
| | | | 62/505 |
| 2007/0002594 A1* | 1/2007 | Otsuka | H05K 7/1432 |
| | | | 315/307 |
| 2007/0120427 A1 | 5/2007 | Iund et al. | |
| 2011/0175496 A1* | 7/2011 | Shirakata | H02P 9/48 |
| | | | 310/68 R |
| 2012/0013283 A1* | 1/2012 | Tallam | H02M 5/4585 |
| | | | 318/400.26 |
| 2012/0153718 A1* | 6/2012 | Rawlinson | H02K 7/006 |
| | | | 307/10.1 |
| 2012/0262881 A1* | 10/2012 | Onimaru | B60L 3/003 |
| | | | 361/701 |
| 2013/0220719 A1 | 8/2013 | Kobayashi | |
| 2015/0002058 A1* | 1/2015 | Kashihara | H02P 6/08 |
| | | | 318/400.3 |
| 2015/0282383 A1 | 10/2015 | Singh et al. | |
| 2016/0107501 A1 | 4/2016 | Johnston | |
| 2017/0257049 A1* | 9/2017 | Jing | H02P 27/08 |
| 2018/0162381 A1 | 6/2018 | Colavincenzo et al. | |
| 2018/0241290 A1* | 8/2018 | Onishi | H02K 19/365 |
| 2019/0013761 A1* | 1/2019 | Seo | B60T 13/745 |
| 2019/0260272 A1 | 8/2019 | Honjo | |
| 2020/0153291 A1 | 5/2020 | Van Der Wal | |
| 2020/0403467 A1* | 12/2020 | Takahashi | H02K 21/14 |
| 2020/0403468 A1* | 12/2020 | Takahashi | H02K 9/197 |
| 2021/0086608 A1 | 3/2021 | Finger-Albert et al. | |
| 2021/0362586 A1 | 11/2021 | Singh | |
| 2021/0379983 A1 | 12/2021 | Baillie et al. | |
| 2021/0379984 A1 | 12/2021 | DeVeny | |
| 2022/0120803 A1* | 4/2022 | Izutani | B60L 50/51 |

OTHER PUBLICATIONS

Bentheimer et al., "Highly Efficient SiC Inverter for Aircraft Application with Innovative Thermal Management," May 7-9, 2019, 8 pages.

Hitachi et al., "Direct Liquid Cooling IGBT Module for Automotive Applications," Fuji Electric Review, vol. 58, No. 2, 2012, 6 pages.

"ShowerPower Cooling Concept," Danfoss Silicon Power GmbH, 2016, 12 pages.

European Patent Office, "Extended European Search Report and Written Opinion," issued in connection with European Patent Application No. 21170479.6, dated Oct. 20, 2021, 8 pages.

United States Patent and Trademark Office, "Non-Final Office Action", issued in connection with U.S. Appl. No. 17/097,871, filed Jul. 6, 2022, 6 pages.

United States Patent and Trademark Office, "Notice of Allowance and Fee(s) Due", issued in connection with U.S. Appl. No. 17/097,871, filed Nov. 16, 2022, 5 pages.

* cited by examiner

LIGHTWEIGHT HIGH-EFFICIENCY, HIGH TEMPERATURE ELECTRIC DRIVE SYSTEM

RELATED APPLICATIONS

This patent arises from a divisional of U.S. patent application Ser. No. 17/097,871, (now U.S. Pat. No. 11,577,601) entitled "Lightweight High-Efficiency, High Temperature Electric Drive System" which was filed on Nov. 13, 2020, and claims the benefit of, and priority to, U.S. Provisional Application Ser. No. 63/027,828, entitled "Lightweight High-Efficiency, High Temperature Electric Drive System" which was filed on May 20, 2020. U.S. patent application Ser. No. 17/097,871 and U.S. Provisional Patent Application No. 63/027,828 are hereby incorporated herein by reference in their entireties. Priority to U.S. patent application Ser. No. 17/097,871 and U.S. Provisional Patent Application No. 63/027,828 is hereby claimed.

FIELD OF THE DISCLOSURE

This disclosure relates generally to electric drive systems, and, more particularly, to a lightweight high-efficiency, high temperature electric drive system.

BACKGROUND

Motor drive system can generate mechanical (rotational) energy to drive a mechanical load using power electronics. Applications of the motor drive systems include electric vehicles, hybrid electric vehicles, among others. Power electronics in a motor drive system could include direct current (DC) to DC converters, DC to alternating current (AC) inverters, AC to DC rectifiers, and AC to AC converters. Power electronic manufacturers can manufacture power electronics using semiconductor materials such a silicon carbide (SiC).

A highly integrated motor drive system includes a power electronics system (DC to AC inverter), an electric motor (eMotor), and a combined thermal management system (TMS). The TMS is also integrated with the power electronics systems and the electric motor. Therefore, resulting system is termed an electric drive (eDrive) with built-in thermal management. This eDrive system could have very high-power density and could synergistically use common cooling media (water and/or oil) for the power electronics and the motor, resulting in a simplified system architecture that requires far less space and volume in electric and hybrid vehicles.

Figure 1A:
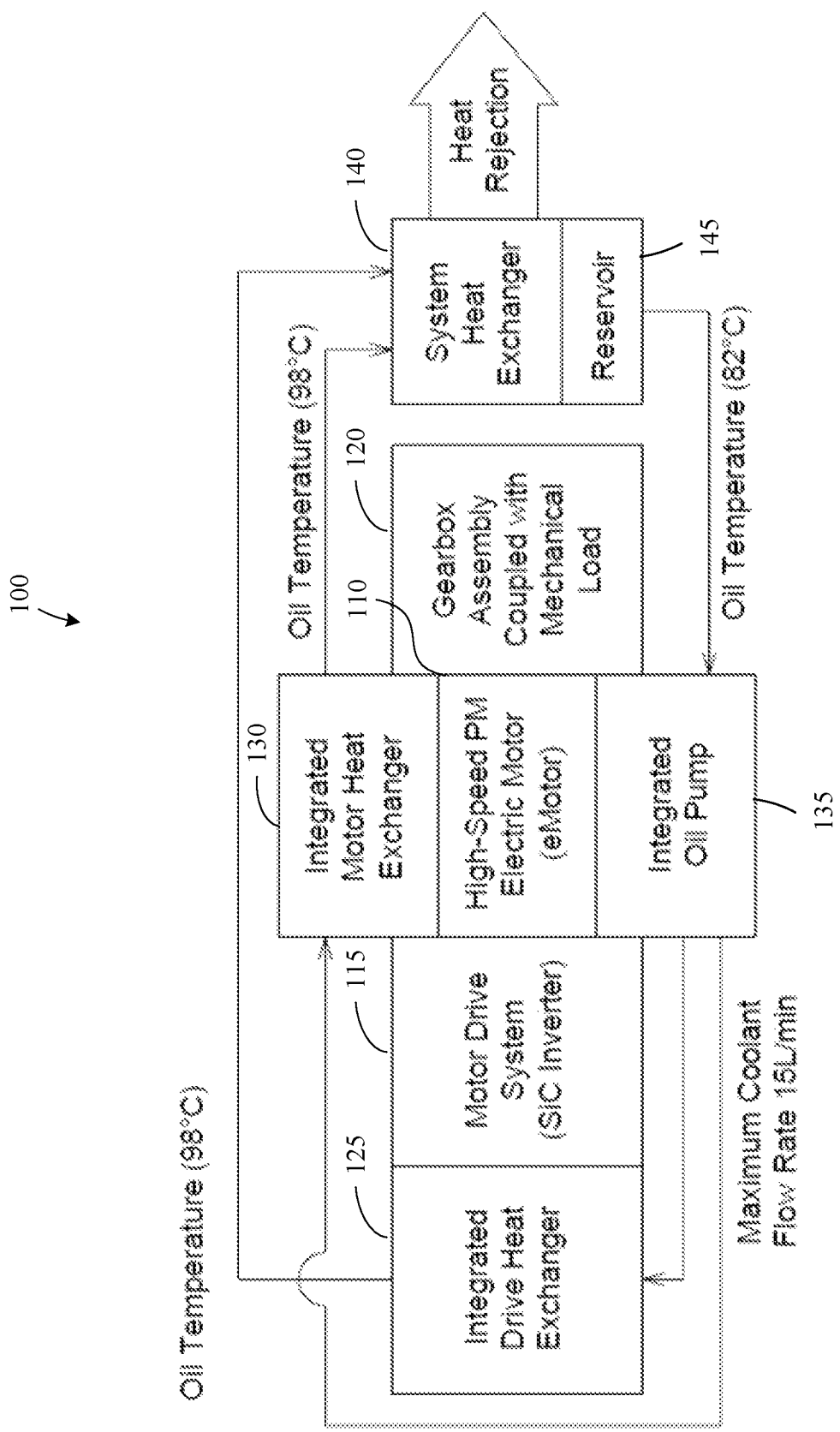
FIG. 1A is a schematic illustration of an example eDrive system with a parallel flow of coolant enabled by the thermal management system in accordance with teachings disclosed herein.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts. Although the figures show layers and regions with clean lines and boundaries, some or all of these lines and/or boundaries may be idealized. In reality, the boundaries and/or lines may be unobservable, blended, and/or irregular.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Conventional electric drive systems have incorporated a silicon inverter to eliminate technical barriers to achieving a lightweight, high-efficiency and high-temperature electric drive system. However, the silicon inverter based conventional electric drive system often requires a large space and runs at lower ambient temperature while offering far lower efficiency compared to examples disclosed herein. Examples disclosed herein propose a 250 kW lightweight, highly-efficient, thermally- and mechanically-robust integrated electric drive that could achieve the demands of applications such as heavy-duty all-electric and hybrid vehicles.

Examples disclosed herein involve a lightweight, high switching frequency Silicon Carbide (SiC) inverter fed by a greater than 1.0 kV DC bus to support the actuation of a lightweight motor with high fundamental frequency in excess of 3 kHz. Additionally, examples disclosed herein include a robust thermal management system to rapidly withdraw the heat generated by the inverter, the high-speed electric-motor (eMotor), and the gearbox. In examples disclosed herein, the inverter, the high-speed eMotor, and the gearbox are assembled in a single housing. Examples disclosed herein further include a mechanical pump that is integrated with the gearbox assembly system driven by eMotor, therefore, some examples disclosed herein have a thermal management system without any external tubes and hoses for the coolant flow. A separate thermal management system is often common with conventional eDrive systems, which is not integrated with the common assembly for inverter fed eMotor. Contrarily, examples disclosed herein include a 275 kW high switching frequency eDrive system that has a built-in thermal management system (TMS). The TMS includes a radiator that operates as a combined heat exchanger for eMotor and inverter, a radiator fan and a coolant pump that are both integrated with the gear-box assembly that is driven by the inverter fed eMotor.

Some examples disclosed herein achieve a high efficiency (e.g., greater than 93%) during 250 kW peak load condition such as, for example, hill climbing. Examples disclosed herein achieve a high efficiency (e.g., about 93%) during 85 kW constant loading that is expected during interstate cruising of a heavy-duty vehicle electrified with examples disclosed herein. In examples disclosed herein, it is assumed that a 1050 V battery-pack will be integrated as the energy source in the case of an all-electric heavy-duty vehicle. Examples disclosed herein, it is also assumed that a 1050 V energy source can be realized using fuel-cell with minimal size battery-pack to get desired dynamic response during acceleration and deacceleration of an all-electric heavy-duty vehicle. In examples disclosed herein, it is assumed that a hybrid heavy-duty vehicle could use diesel engine in conjunction with two embodiments of examples disclosed herein. For example, one embodiment for the source-side power/energy management and another embodiment for the load-side power/energy management. In this case, the thermal management system is integrated with an embodiment that is used to realize the source-side power/energy management system, and the load-side embodiment could have an optional TMS system. This design significantly simplifies the architecture of a hybrid heavy-duty vehicle because a common TMS system could be used to cool two electric motors, two inverters and circulates coolant through two cooling rings with each cooling ring having captured lap-joints between an inverter and an electric motor (eMotor).

Examples disclosed herein include an electric motor including an output shaft. Additionally, examples disclosed herein include power electronics electrically coupled to the electric motor, wherein the power electronics include an inverter. Additionally, example disclosed herein include a gearbox coupled to the output shaft. Examples disclosed herein additionally include a first heat exchanger coupled to a surface (with built-in coolant channels) of the electric motor, the first heat exchanger including coolant. Examples disclosed herein additionally include a second heat exchanger coupled to a surface (with built-in coolant channels) of the power electronics, the second heat exchanger including the coolant. In examples disclosed herein, the first heat exchanger and the second heat exchanger are coupled to a pump, and the pump is coupled to the output shaft.

In examples disclosed herein, the connection between the electric motor and the power electronics are lap joints. In examples disclosed herein, the electric motor, the power electronics, the gearbox, the first heat exchanger, and the second heat exchanger are included in one single housing.

Examples disclosed herein additionally include a fan to pull air through (draft-air) the electric-drive system, wherein the air is to cool coolant in a radiator. Additionally, examples disclosed herein include a coolant pump to receive the coolant from the radiator and provide the coolant to an electric motor and power electronics. In examples disclosed herein, the coolant pump includes three outlets, a first outlet to the power electronics, a second outlet to the electric motor, and a third outlet to cooling ring that encloses lap-joint-based electrical connections between the power electronics and the electric motor. In example disclosed herein, the coolant pump additionally includes at least one of a centrifugal impeller pump or a vane impeller pump. Additionally, examples disclosed herein include a first coolant channel to exchange heat from the electric motor to the coolant, the coolant channel coupled to the electric motor. Examples disclosed herein additionally include a second coolant channel to exchange heat from the power electronics to the coolant, the second coolant channel coupled to the power electronics.

Examples disclosed herein additionally include a reservoir to store coolant from the electric motor and power electronics, the reservoir to provide the stored coolant to the radiator. Additionally, examples disclosed herein include a first insulation material between the first coolant channel and the electric motor and a second insulation material between the second coolant channel and the power electronics.

FIG. 1A is a schematic illustration of an example electric drive system 100 including a parallel thermal management system in accordance with teachings disclosed herein, where parallel flow of coolant is enabled by the thermal management. The example electric drive system 100 includes an example high-speed permanent magnet (PM) electric motor (eMotor) 110, an example motor drive system (SiC inverter) 115, an example gearbox assembly coupled with mechanical load 120, an example integrated drive heat exchanger 125, an example integrated motor heat exchanger 130, an example integrated oil pump 135, an example system heat exchanger 140, and an example reservoir 145.

In the illustrated example of FIG. 1A, the example high-speed PM electric motor 110 generates mechanical energy to be used by the example gearbox assembly coupled with mechanical load 120 to drive the mechanical load. In the illustrated example of FIG. 1A, the example high-speed PM electric motor 110 is power-dense (e.g., 75.8 kW/L), lightweight (e.g., 62.5 kW/kg), and highly efficient (e.g., 97.28%). In the illustrated example of FIG. 1A, the example high-speed PM electric motor 110 includes 250 kW, 690 V root-mean-square (RMS) line-to-line, 4-pole, capable of operating at 60,000 rotations per minute (RPM). In some examples, the example high-speed PM electric motor 110 has a weight of 4.0 kg and a size of 3.3 L.

The example motor drive system 115 of the illustrated example FIG. 1A includes a silicon carbide (SiC) inverter. The example motor drive system 115 provides power to the example high-speed PM electric motor 110. In the illustrated example of FIG. 1A, the example motor drive system 115 is power-dense (e.g., 55 kW/L), lightweight (e.g., 45.8 kW/kg), and highly efficient (e.g., 97.35%). In the illustrated example of FIG. 1A, the SiC inverter of the example motor drive system 115 includes 275 kW, a 1050 VDC Bus, 3 kHz fundamental-frequency, and greater than or equal to 100 kHz switching-frequencies. In some examples, the SiC inverter of the example motor drive system 115 has a weight of 6.0 kg and a size of 5 L. In the illustrated example of FIG. 1A, the example motor drive system 115 is coupled to the example high-speed PM electric motor 110.

In the illustrated example of FIG. 1A, the example gearbox assembly coupled with mechanical load 120 drives the mechanical load 120 with the mechanical energy from the example high-speed PM electric motor 110. The example gearbox assembly coupled with mechanical load 120 keeps the speed of a mechanical load at less than or equal to 12,000 RPM. In the illustrated example of FIG. 1A, the example gearbox assembly coupled with mechanical load 120 is implemented as a 5× ratio gearbox between the example high-speed PM electric motor 110 and the mechanical load 120. In some examples, the example gearbox assembly coupled with mechanical load 120 has a weight of 4.2 kg and a size of 3.5 L. In the illustrated example of FIG. 1A, the example gearbox assembly coupled with mechanical load 120 is coupled to the example high-speed PM electric motor 110.

In the illustrated example of FIG. 1A, the example integrated oil pump 135 circulates gearbox-oil (coolant) across the example integrated drive heat exchanger 125 and the example integrated motor heat exchanger 130 to the example system heat exchanger 140, separately. In examples disclosed herein, the coolant can include automatic transmission fluid (ATF) or other example synthetic dielectrics with high latent heat and high heat carrying capacity which still result in a light-weight electric drive system for heavy-duty vehicle applications (e.g., electric drive system 100). In the illustrated example of FIG. 1A, it is assumed that coolant is pumped in parallel (e.g., once to each of the objects to be cooled at the same time and inlet temperature of coolant for each of the object is similar). Therefore, in FIG. 1A, the integrated oil pump 135 collects cooled gear-box oil (about 82 degrees Celsius) from the example reservoir 145. The example integrated oil pump 135 disperses the cooled gear-box-oil to the example integrated drive heat exchanger 125 and the example integrated motor heat exchanger 130 separately. The example integrated oil pump 135 drives the warmed gearbox-oil from the example integrated drive heat exchanger 125 and the example integrated motor heat exchanger 130 to the example system heat exchanger 140 separately where the heat is output into the external environment. In the illustrated example of FIG. 1A, the example integrated oil pump 135 is coupled to the example integrated drive heat exchanger 125, the example integrated motor heat exchanger 130, and the example system heat exchanger 140 through tubing (e.g., the lines with arrows in the example FIG. 1A).

The example integrated drive heat exchanger 125 of the illustrated example FIG. 1A exchanges heat from the example motor drive system 115 to the gear-box oil from the example integrate oil pump 135. In the illustrated example of FIG. 1A, the example integrated drive heat exchanger 125 is coupled to the example motor drive system 115. In the illustrated example, the example integrated drive heat exchanger 125 receives the gear-box oil at a maximum flow rate of 15 L/min. In the illustrated example of FIG. 1A, the example integrated motor heat exchanger 130 exchanges heat from the example high-speed PM electric motor 110 to the gear-box oil from the example integrate oil pump 135. In the illustrated example of FIG. 1A, the example integrated motor heat exchanger 130 is coupled to the example high-speed PM electric motor 110.

The example system heat exchanger 140 of the illustrated example FIG. 1A cools the gear-box oil from the example integrated drive heat exchanger 125 and the example integrated motor heat exchanger 130. The example system heat exchanger 140 removes the heat collected by the gear-box oil, and outputs the heat into the external environment. In the illustrated example of FIG. 1A, the example system heat exchanger 140 is coupled to the example integrated drive heat exchanger 125 and the example integrated motor heat exchanger 130. In the illustrated example of FIG. 1A, the example reservoir 145 stores the cooled gearbox-oil for use by the example integrated oil pump 135. In some examples, the example reservoir stores gearbox-oil at 82 degrees Celsius. In the illustrated example of FIG. 1A, the example reservoir 145 is coupled to the example system heat exchanger 140.

Figure 1B:
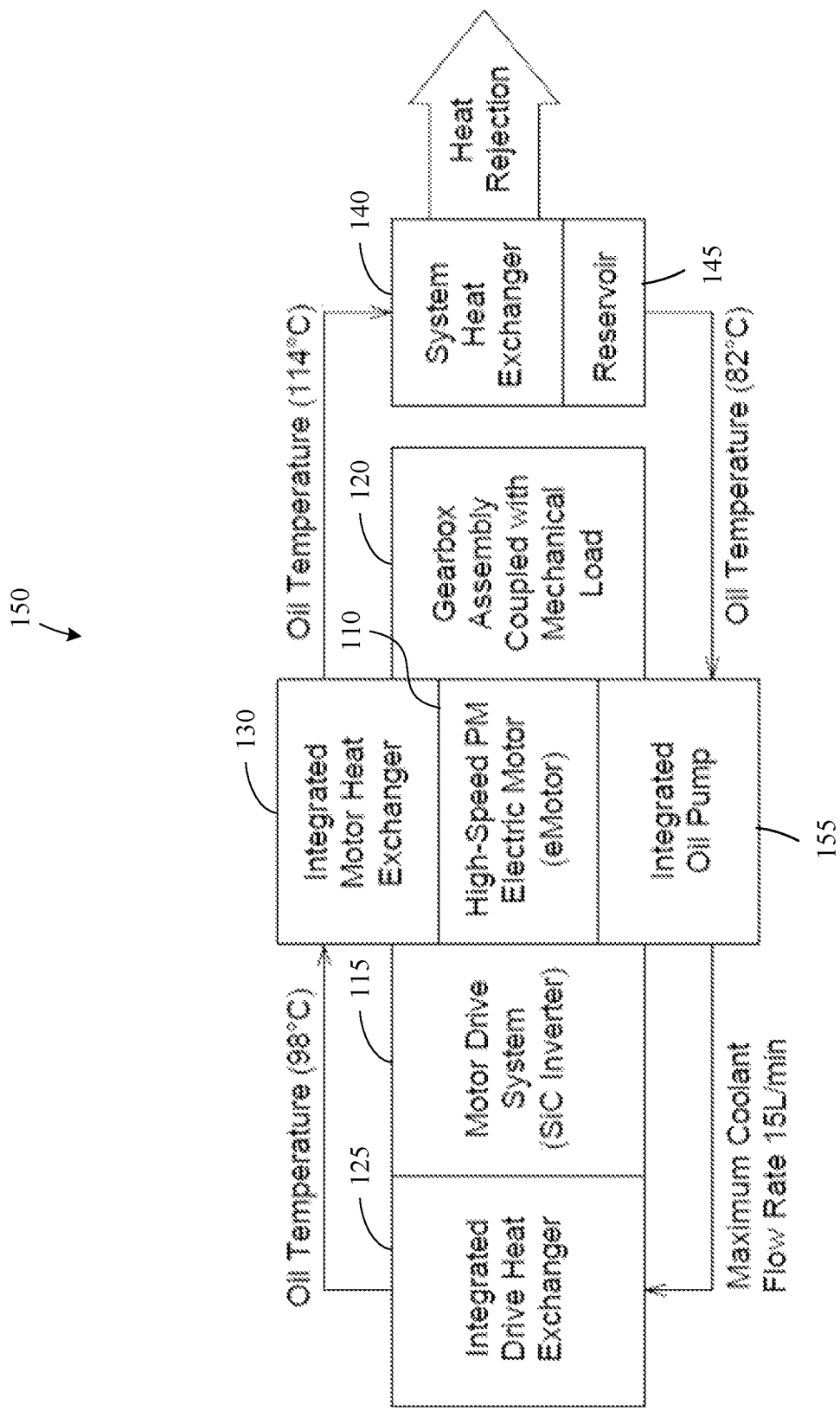
FIG. 1B is a schematic illustration of an example electric drive (eDrive) system with a serial flow of coolant enabled by the thermal management system in accordance with teachings disclosed herein.

FIG. 1B is a schematic illustration of an example electric drive system 150 with a serial thermal management system in accordance with teachings disclosed herein, where serial flow of coolant is enabled by the thermal management. The example electric drive system 150 includes the example high-speed PM electric motor 110, the example motor drive system 115, the example gearbox assembly coupled with mechanical load 120, the example integrated drive heat exchanger 125, the example integrated motor heat exchanger 130, the example system heat exchanger 140, and the example reservoir 145. The example electric drive system 150 includes an example integrated oil pump 155.

The example integrated oil pump 155 of the illustrated example FIG. 1B circulates gearbox-oil (coolant) across the example integrated drive heat exchanger 125, the example integrated motor heat exchanger 130, and the example system heat exchanger 140. In examples disclosed herein, the coolant can include ATF or other example synthetic dielectrics with high latent heat and high heat carrying capacity which still result in a light-weight electric drive system for heavy-duty vehicle applications (e.g., electric drive system 150). In the illustrated example of FIG. 1B, it is assumed that coolant is pumped serially (e.g., one after other objects to be cooled). Therefore, in FIG. 1B, the integrated oil pump 155 collects cooled gear-box oil (about 82 degrees Celsius) from the example reservoir 145. The example integrated oil pump 155 disperses the cooled gear-box-oil to the example integrated drive heat exchanger 125 and the example integrated motor heat exchanger 130. In the illustrated example of FIG. 1B, the temperature of the gearbox-oil after the example integrated drive heat exchanger is about 98 degrees Celsius. In the illustrated example of FIG. 1B, the temperature of the gearbox-oil after the example integrated motor heat exchanger 130 is about 114 degrees Celsius. The example integrated oil pump 155 drives the warmed gearbox-oil from the example integrated drive heat exchanger 125 and the example integrated motor heat exchanger 130 to the example system heat exchanger 140 where the heat is output into the external environment. In the illustrated example of FIG. 1B, the example integrated oil pump 155 is coupled to the example integrated drive heat exchanger 125, the example integrated motor heat exchanger 130, and the example system heat exchanger 140 through tubing (e.g., the lines with arrows in the example FIG. 1B).

The example integrated oil pump 155 of the illustrated example of FIG. 1B includes a planetary gear-coupled with the example high-speed PM electric motor 110 to pump gearbox-oil through the example electric drive system 150. The example integrated oil pump 155 eliminates the need for an electric pump to circulate the gearbox-oil, which results in weight reduction and increased reliability due to the elimination of the electronic circuit needed to drive a conventional electric pump. In the illustrated example, the maximum power consumed by the planetary gear-coupled integrated oil pump 155 is about 300 watts at the targeted operating temperatures of FIG. 1B. In the illustrated example of FIG. 1B, the example integrated oil pump 155 is coupled with the example integrated drive heat exchanger 125, the example integrated motor heat exchanger 130, and the example system heat exchanger 140 that have a combined weight of 6.5 kg and a size of 5 L.

Figure 2A:
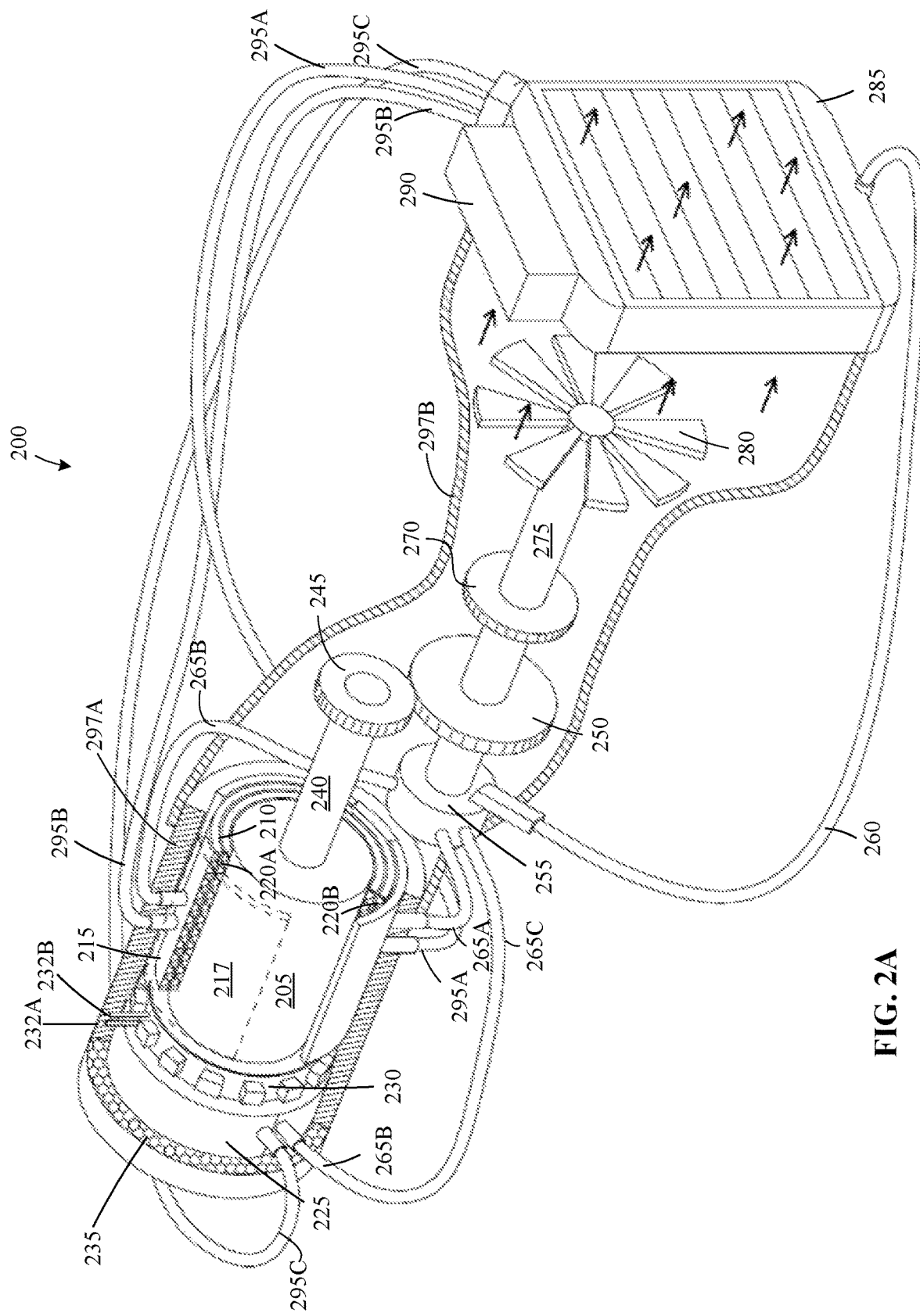
FIG. 2A is a perspective view of the eDrive system of FIG. 1A.

FIG. 2A is a perspective view of the example electric drive system 100 of FIG. 1A. The example highly-integrated electric drive system 200 of FIG. 2A includes an example electric motor 205, an example insulating sleeve 210, an example inverter 215, an example inverter phase 217, an example coolant channel 220A for example electric motor 205, an example coolant channel 220B for example inverter 215, an example cooling ring 225, an example capacitor ring 230, example power inputs 232A, 232B, an example air filter 235, an example motor shaft 240, an example driver gear 245, an example idle (coupling) gear 250, an example coolant pump 255, an example cooled coolant input 260, example coolant pump outputs 265A-265C, an example load gear 270, an example common shaft 275, an example fan 280, an example radiator 285, an example reservoir 290, example used coolant collection channels 295A-295C, an example rigid portion of an outer jacket 297A, and an example flexible portion of the outer jacket 297B. The outer jacket ensures draft-air flow over the example highly-integrated electric drive system 200 to keep temperature of example capacitor ring 230 closely tied to air-ambient around the example highly-integrated electric drive system 200.

The example electric motor 205 of the illustrated example of FIG. 2A generates mechanical energy to drive a mechanical load. In the illustrated example of FIG. 2A, the electric motor 205 is a permanent magnet electric motor. The example electric motor 205 is electrically coupled to the example inverter 215. A first portion of the outer surface of the example electric motor 205 is coupled to the inner surface of the example coolant channel 220A. In the illustrated example of FIG. 2A, the first portion is on the right side of the example electric motor 205. The example coolant channel 220A provides coolant to the example electric motor 205. The coolant in the example coolant channel 220A absorbs heat generated by the example electric motor 205.

The example inverter 215 of the illustrated example of FIG. 2A supplies high-frequency current and voltages to the example electric motor 205. In the illustrated example of FIG. 2A, the inverter 215 is a silicon carbide (SiC) inverter. The inner surface of the example inverter 215 is coupled to the outer surface of the example coolant channel 220B. The example coolant channel 220B provides coolant to the example inverter 215. The coolant in the example coolant channel 220B absorbs heat generated by the example inverter 215. In the illustrated example of FIG. 2A, the example inverter phase 217 represents a phase of the example inverter 215. The example inverter 215 includes three phases that are substantially similar to the example inverter phase 217. The three phases of the example inverter 215 are further described in connection with FIG. 7 below.

In the illustrated example of FIG. 2A, the example insulating sleeve 210 is coupled to the outer surface of the example coolant channel 220A and the inner surface of the example coolant channel 220B. The example insulating sleeve 210 is coupled between the coolant channel 220A and the coolant channel 220B to separate the heat exchange between the example electric motor 205 and the example coolant channel 220A from the heat exchange between the example inverter 215 and the example coolant channel 220B.

In the illustrated example of FIG. 2A, the example cooling ring 225 is coupled to a second portion of the outer surface of the example electric motor 205. In the illustrated example of FIG. 2A, the second portion of the outer surface of the example electric motor 205 is to the left of the first portion of the outer surface that is coupled to the example coolant channel 220B. In some examples, the cooling ring 225 captures the lap-joints for electrical power connections between the example electric motor 205 and the example inverter 215. The example cooling ring 225 includes a coolant channel. The coolant in the coolant channel of the example cooling ring 225 absorbs the heat generated due to resistive nature of electrical power connection between the example electric motor 205 and the example inverter 215. The example cooling ring 225 captures the electrical power lap joints between the example inverter 215 and the example electric motor 205 and provides cooling to make sure that heat does not travel from the example inverter 215 and the example electric motor 205 and vice versa.

In the illustrated example of FIG. 2A, the example capacitor ring 230 generates high-frequency, time-varying power for the example inverter 215. In the illustrated example of FIG. 2A, the example capacitor ring 230 includes the example power inputs 232A, 232B. The example power input 232A provides negative direct current (DC) power and the example power input 232B provides positive DC power to the example capacitor ring 230. In the illustrated example of FIG. 2A, the example power inputs 232A, 232B receive the negative DC power and positive DC power respectively from an external source such as, for example, a battery, a fuel-cell, etc. In the illustrated example, the example capacitor ring 230 is mounted on the outer surface of the example electric motor 205. The capacitor ring 230 is coupled between the example cooling ring 225 and the example inverter 215. In the illustrated example of FIG. 2A, the example capacitor ring 230 is coupled to the example inverter 215 using pressurized connections for positive and negative DC voltage. The connections between the example capacitor ring 230 and the example inverter 215 are described in further detail below in connection with FIG. 7. In the illustrated example of FIG. 2A, the example capacitor ring 230 is cooled by the external air (draft-air contained by example outer jacket 297) that has passed through the example air filter 235.

The example air filter 235 of the illustrated example of FIG. 2A is provided to filter the external air pulled into the example electric drive system 200. The example air filter 235 is coupled to a third portion of the outer surface of the example electric motor 205. In the illustrated example of FIG. 2A, the third portion is to the left of the second portion of the outer surface that is coupled to the example cooling ring 225.

In the illustrated example of FIG. 2A, the example electric motor 205 is coupled to the example motor shaft 240. The example motor shaft 240 is driven by the example electric motor 205. In the illustrated example of FIG. 2A, the example motor shaft 240 is coupled to the example driver gear 245. The example motor shaft 240 drives the example driver gear 245 using the mechanical output from the example electric motor 205. In the illustrated example of FIG. 2A, the example driver gear 245 is coupled to the example idle (coupling) gear 250. The example idle (coupling) gear 250 is coupled to the example common shaft 275. The example idle (coupling) gear 250 is driven by the example driver gear 245. The example idle (coupling) gear 250 drives the example common shaft 275.

In the illustrated example of FIG. 2A, the example coolant pump 255 is coupled to the example common shaft 275. The example coolant pump 255 is coupled to one end of the example common shaft 275. In the illustrated example, the example coolant pump 255 is coupled to the left end of the example common shaft 275. In the illustrated example, the left end of the common shaft 275 is the end closest to the example electric motor 205. The example coolant pump 255 is coupled to the left of the example common shaft 275 to prevent any coolant leaks because the end of the example common shaft 275 allows appropriate sealing of the example coolant pump 255, thereby preventing any coolant leak from the example coolant pump 255. The example coolant pump 255 is driven by the example common shaft 275. The example coolant pump 255 collects coolant from the example radiator 285 and disperses the coolant to the example coolant channels 220A, 220B and the coolant channel of the example cooling ring 225. In some examples, the coolant pump 255 can be implemented as a centrifugal impeller style pump. In some examples, the coolant pump 255 can be implemented as a vane impeller style pump.

In the illustrated example of FIG. 2A, the example coolant pump 255 collects coolant from the example radiator 285 through the example cooled coolant input 260. The example cooled coolant input 260 is coupled to an opening on the outer surface of the example coolant pump 255. In the illustrated example of FIG. 2A, the example coolant pump 255 disperses the coolant to the example coolant channel 220A through the example coolant pump output 265A. The example coolant pump output 265A is coupled to an opening on the outer surface of the example coolant pump 255. The example coolant pump output 265A is coupled to an opening to the example coolant channel 220A.

In the illustrated example of FIG. 2A, the example coolant pump 255 disperses the coolant to the example coolant channel 220B through the example coolant pump output 265B. The example coolant pump output 265B is coupled to an opening on the outer surface of the example coolant pump 255. The example coolant pump output 265B is coupled to an opening to the example coolant channel 220B. In the illustrated example of FIG. 2A, the example coolant pump 255 disperses the coolant to the coolant channel in the example cooling ring 225 through the example coolant pump output 265C. The example coolant pump output 265C is coupled to an opening on the outer surface of the example coolant pump 255. The example coolant pump output 265C is coupled to an opening on the outer surface of the example cooling ring 225.

In the illustrated example of FIG. 2A, the example load gear 270 is coupled to the example common shaft 275. The example load gear 270 drives an output mechanical load for the electric drive system 200 of FIG. 2A. The example load gear 270 is driven by the example common shaft 275. In the illustrated example of FIG. 2A, the example load gear 270 is coupled to the example common shaft 275 to the right of the example idle (coupling) gear 250.

In the illustrated example of FIG. 2A, the example fan 280 is coupled to the example common shaft 275. The example fan 280 is driven by the example common shaft 275. The example fan 280 produces air flow (draft-air) within the example electric drive system 200. The example fan 280 pulls in external air through the example air filter 235. The example fan 280 propels the external air through the example radiator 285 as shown by the arrows present in the illustrated example of FIG. 2A. The example fan 280 is coupled to the right end of the example common shaft 275. In the illustrated example of FIG. 2A, the example fan 280 is coupled to the common shaft 275 to the right of the example load gear 270.

The example radiator 285 of the illustrated example of FIG. 2A cools coolant using the air propelled by the example fan 280. The example radiator 285 collects coolant from the example reservoir 290 to cool. The example radiator 285 provides the cooled coolant to the example coolant pump 255 through the example cooled coolant input 260. In the illustrated example, the example radiator 285 is coupled to the example reservoir 290. The example reservoir 290 is coupled to the top surface of the example radiator 285.

In the illustrated example of FIG. 2A, the example reservoir 290 collects and stores coolant. The example reservoir 290 collects coolant from the example used coolant collection channels 295A-295C. In the illustrated example of FIG. 2A, the used coolant collection channel 295A collects used coolant from the example coolant channel 220A. In the illustrated example of FIG. 2A, the used coolant collection channel 295B collects used coolant from the example coolant channel 220B. In the illustrated example of FIG. 2A, the used coolant collection channel 295C collects used coolant from the coolant channel in the example cooling ring 225.

In the illustrated example of FIG. 2A, the example rigid portion of the outer jacket 297A and the example flexible portion of the outer jacket 297B encloses the example electric drive system 200. The example rigid portion of the outer jacket 297A and the example flexible portion of the outer jacket 297B provide an enclosed space for the air flow (draft-air) forced by the example fan 280. In the illustrated example of FIG. 2A, the example rigid portion of the outer jacket 297A is coupled to the example air filter 235 and the non-drive end of the example electric motor 205. In the illustrated example of FIG. 2A, the example flexible portion of the outer jacket 297B is coupled to the drive end of the example electric motor 205 and the example radiator 285.

Figure 2B:
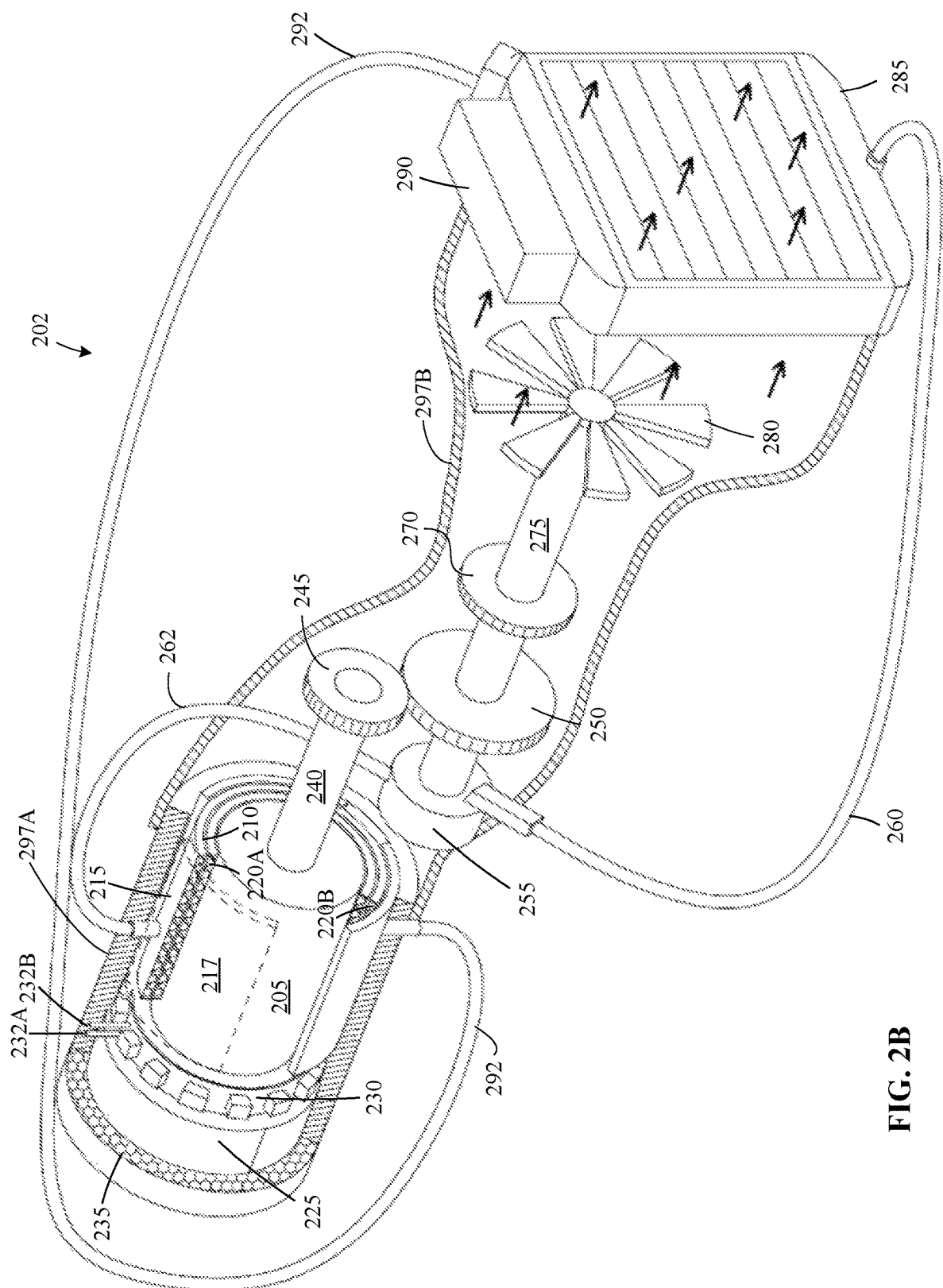
FIG. 2B is a perspective view of the eDrive system of FIG. 1B.

FIG. 2B is a perspective view of the example electric drive system 150 of FIG. 1B. The example highly-integrated electric drive system 202 of FIG. 2B includes the example electric motor 205, the example insulating sleeve 210, the example inverter 215, the example inverter phase 217, the example coolant channel 220A for example electric motor 205, the example coolant channel 220B for example inverter 215, the example cooling ring 225, the example capacitor ring 230, the example power inputs 232A, 232B, the example air filter 235, the example motor shaft 240, the example driver gear 245, the example idle (coupling) gear 250, the example coolant pump 255, the example cooled coolant input 260, the example load gear 270, the example common shaft 275, the example fan 280, the example radiator 285, the example reservoir 290, the example rigid portion of an outer jacket 297A, and the example flexible portion of the outer jacket 297B of the example highly-integrated electric drive system 200 of FIG. 2A. The example highly-integrated electric drive system 202 of FIG.

2B further includes an example coolant channel input 262 and an example coolant channel output 292.

In the illustrated example of FIG. 2B, the example coolant pump 255 collects coolant from the example radiator 285 through the example cooled coolant input 260. The example cooled coolant input 260 is coupled to an opening on the outer surface of the example coolant pump 255. In the illustrated example of FIG. 2A, the example coolant pump 255 disperses the coolant to the example coolant channel 220B for the example inverter 215 through the example coolant channel input 262. The example coolant channel input 262 is coupled to an opening on the outer surface of the example coolant pump 255. The example coolant channel input 262 is coupled to an opening to the example coolant channel 220B.

In the illustrated example of FIG. 2B, the example coolant pump 255 disperses the coolant to the coolant channel in the example cooling ring 225 from the example coolant channel 220B. In the illustrated example of FIG. 2B, the example coolant pump 255 disperses the coolant to the example coolant channel 220A for the example electric motor 205 from the example coolant channel in the example cooling ring 225. In the illustrated example of FIG. 2B, the example coolant pump 255 disperses the coolant from the example coolant channel 220A to the example radiator 285 through the example coolant channel output 292. The example coolant pump 255 disperses the coolant used by the example coolant channel 220B, the coolant channel in the cooling ring 225, and the coolant channel 220A back to the radiator 285 through the example coolant channel output 292. The example coolant channel output 292 is coupled to an opening to the example coolant channel 220A.

Figure 2C:
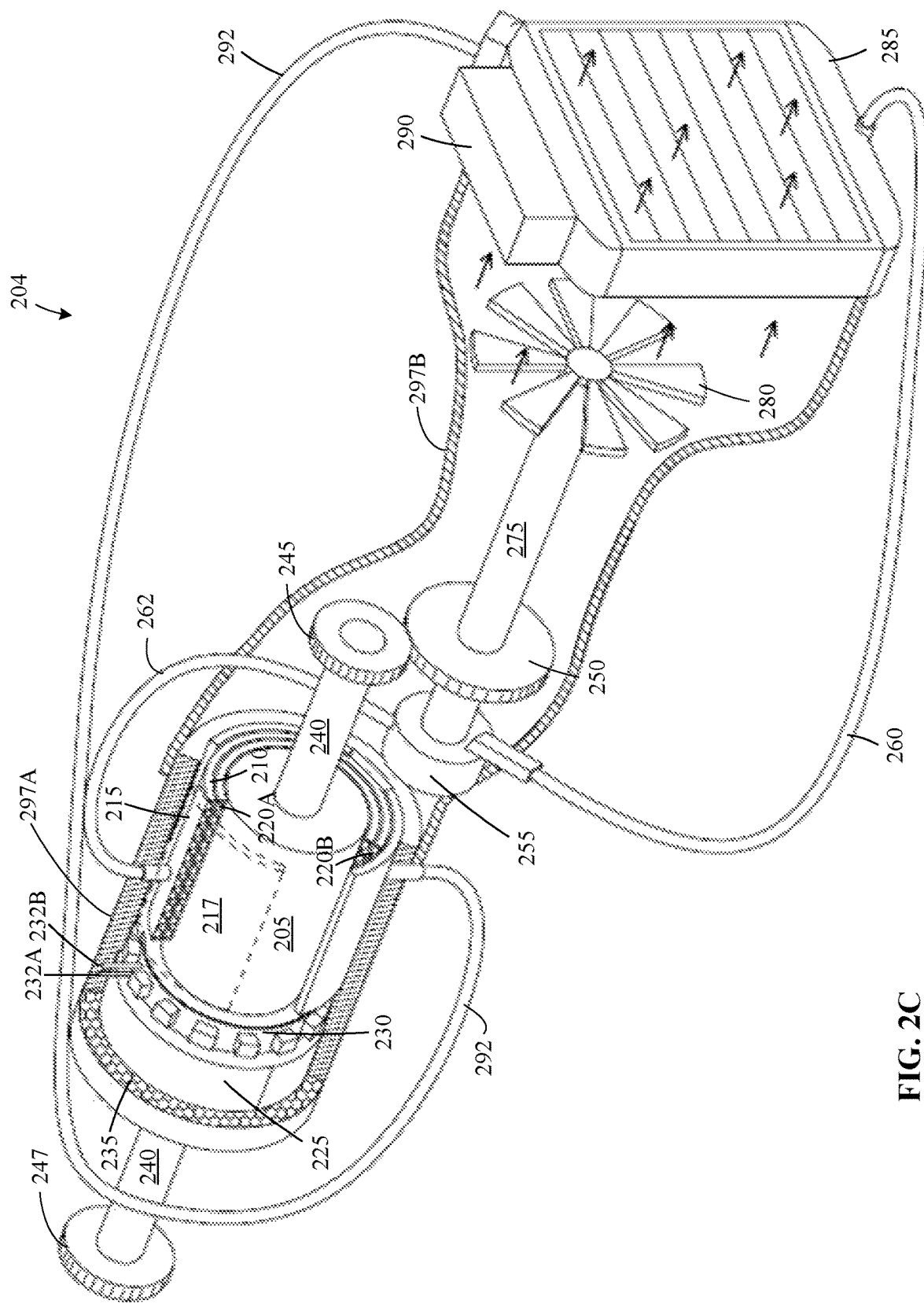
FIG. 2C is a perspective view of an alternative example of the eDrive system of FIG. 2B.

FIG. 2C is a perspective view of an alternative example of the example eDrive system 202 of FIG. 2B. The example highly-integrated electric drive system 204 of FIG. 2C includes the example electric motor 205, the example insulating sleeve 210, the example inverter 215, the example inverter phase 217, the example coolant channel 220A for example electric motor 205, the example coolant channel 220B for example inverter 215, the example cooling ring 225, the example capacitor ring 230, the example power inputs 232A, 232B, the example air filter 235, the example motor shaft 240, the example driver gear 245, the example idle (coupling) gear 250, the example coolant pump 255, the example cooled coolant input 260, the example common shaft 275, the example fan 280, the example radiator 285, the example reservoir 290, the example rigid portion of an outer jacket 297A, and the example flexible portion of the outer jacket 297B of the example highly-integrated electric drive system 200 of FIG. 2A. The example highly-integrated electric drive system 204 of FIG. 2C includes the example coolant channel input 262 and the example coolant channel output 292 of the example highly-integrated electric drive system 202 of FIG. 2B. The example highly-integrated electric drive system 204 of FIG. 2C further includes an example load gear 247.

In the illustrated example of FIG. 2C, the example load gear 247 is coupled to the example motor shaft 240. The example load gear 247 is coupled to the example motor shaft unlike the example load gear 270 that is coupled to the example common shaft 275 of FIG. 2B. The example load gear 247 drives an output mechanical load for the electric drive system 204 of FIG. 2C. The example load gear 247 is driven by the example motor shaft 240. In the illustrated example of FIG. 2C, the example load gear 247 is coupled to the example motor shaft 240 to the left of the example electric motor 205, the example cooling ring 225, the example capacitor ring 230, and the example air filter 235.

Figure 3A:
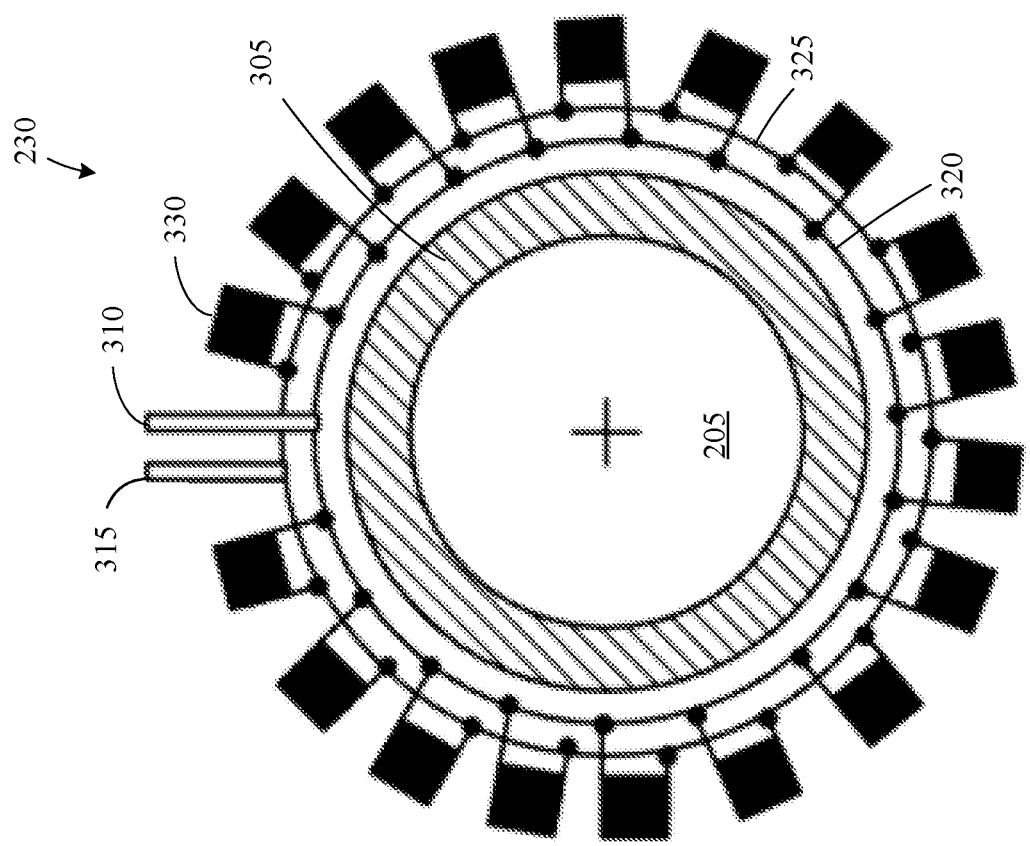
FIG. 3A is a perspective view of an example capacitor ring included in the example eDrive systems of FIGS. 2A, 2B.

FIG. 3A is a perspective view of an example capacitor ring 230 included in the example electric drive system 200 of FIG. 2A. The example capacitor ring 230 of FIG. 3A shows a side view of the example electric motor 205. The example capacitor ring 230 includes an example insulating ring 305, an example DC positive power connection 310, an example DC negative power connection 315, an example DC positive bus bar 320, an example DC negative bus bar 325, and an example capacitor element 330. In the illustrated example of FIG. 3A, the example capacitor ring 230 is slid over the example electric motor 205 and is connected with the example inverter 215 using three pairs (DC+ and DC−) of pressurized connections, one for each phase of the example inverter 215.

The example insulating ring 305 of the illustrated example of FIG. 3A protects the example DC positive bus bar 320, the example DC negative bus bar 325, and the example capacitor element 330 from heat generated by the example electric motor 205 of the example electric drive system 200 of FIG. 2A. The example insulating ring 305 reduces the heat exchange between the example electric motor 205 and the example DC positive bus bar 320, the example DC negative bus bar 325, and the example capacitor element 330. The example insulating ring 305 is coupled to the outer surface of the example electric motor 205 and the inner surface of the example DC positive bus bar 320.

The example DC positive bus bar 320 and the example DC negative bus bar 325 of the illustrated example of FIG. 3A provides direct current (DC) power to the example capacitor element 330. The example DC negative bus bar 325 includes the example DC negative power connection 315. The example DC positive bus bar 320 includes the example DC positive power connection 310. In some examples, the example DC positive power connection 310 and the example DC negative power connection 315 receive the DC power supply from an external power supply such as, for example, a battery, a fuel-cell, etc. In some examples, the external power supply to provide DC power could be a similar embodiment connected with engine-driven system in hybrid-vehicles. In some examples, the example DC positive power connection 310 and the example DC negative power connection 315 are substantially similar to the example power inputs 232A, 232B in the illustrated example of FIG. 2A. In the illustrated example of FIG. 3A, the example DC positive bus bar 320 and the example DC negative bus bar 325 are flexible laminated bus bar made of $Al_2O_3$ (alumina) coated copper or aluminum sheets.

The example capacitor element 330 of the illustrated example of FIG. 3A provides high-frequency, time-varying power to the example inverter 215 of the example electric drive system 200 of FIG. 2A. The example capacitor element 330 receives positive and negative DC voltage from the example DC positive bus bar 320 and the example DC negative bus bar 325, respectively. The example capacitor element 330 stores the DC power from the example DC positive bus bar 320 and the example DC negative bus bar 325 and provides high-frequency, time-varying power for proper function and switching of the example inverter 215. The example capacitor ring 230 is not limited to the number of capacitor elements illustrated. The example capacitor ring 230 can include a plurality of capacitor elements with similar features to provide high-frequency, time-varying power to the example inverter 215 to provide stable voltage across the DC bus bar of the example inverter 215 and to fulfill switching ripples current (time varying current)

requirement of the example inverter 215. Capacitor elements are inserted in the flexible DC positive bus bar 320 and DC negative bus bar 325 and then folded in the ring-shape and the inner surface of this ring shape capacitor module is the example insulating ring 305.

Figure 3B:
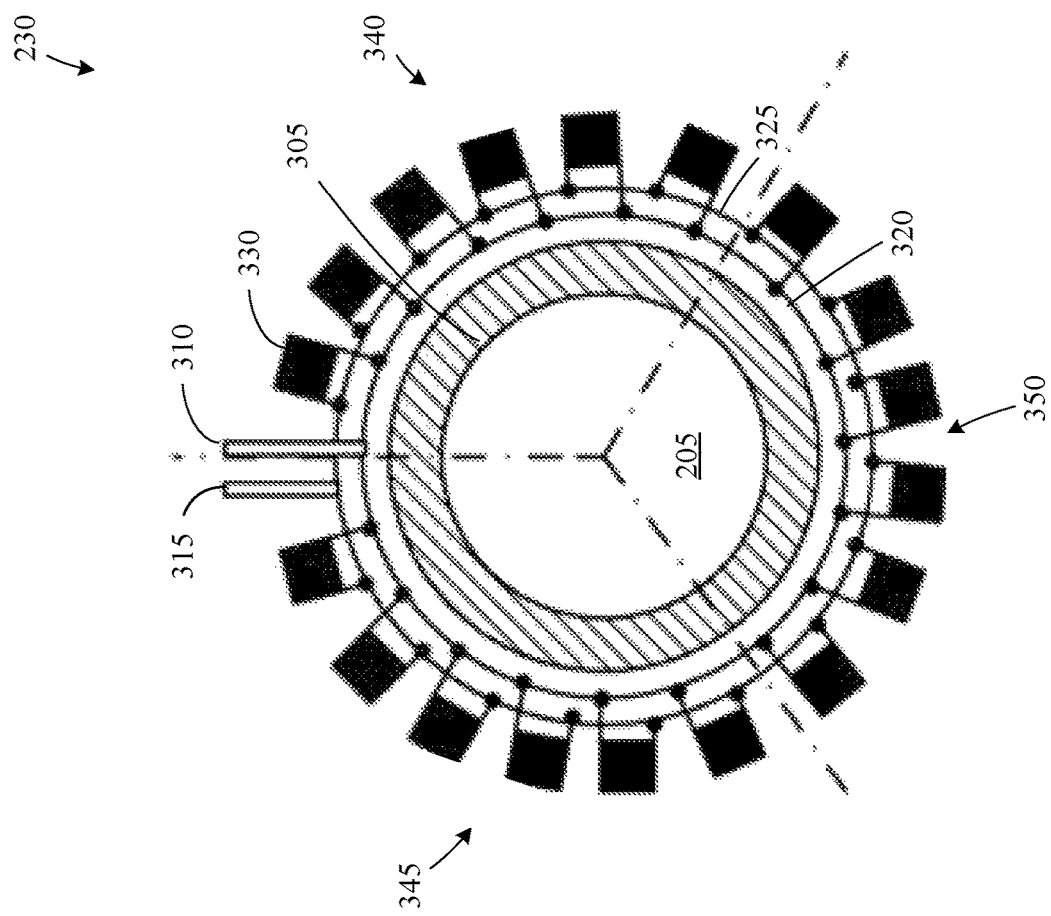
FIG. 3B is a perspective view of the example capacitor ring of FIG. 3A including sections of capacitor ring that are aligned with the phases of an inverter included in the example eDrive systems of FIGS. 2A, 2B.

FIG. 3B is a perspective view of the example capacitor ring 230 of FIG. 3A including the phases of the example inverter 215 included in the example eDrive systems of FIGS. 2A, 2B. The example capacitor ring 230 of FIG. 3B shows side view of the example electric motor 205. The example capacitor ring 230 includes the example insulating ring 305, the example DC positive power connection 310, the example DC negative power connection 315, the example DC positive bus bar 320, the example DC negative bus bar 325, and the example capacitor element 330. The example DC positive bus bar 320, the example DC negative bus bar 325 are coated with $Al_2O_3$ to make sure necessary insulation and voltage withstand capability exists between the example DC positive bus bar 320, the example DC negative bus bar 325. The example capacitor ring 230 of FIG. 3B further includes an example section of first phase 340, an example section of second phase 345, and an example section of third phase 350. The example phases 340, 345 and 350 of the example capacitor ring 230 are electrically connected with the example inverter phases 705, 710, 715 of FIG. 7, respectively.

In the illustrated example of FIG. 3B, the example first phase 340, the example second phase 345, and the example third phase 350 refer to the three phases of the example inverter 215. The three phases of the example inverter 215 are further described below in connection with the illustrated example of FIG. 7. In the illustrated example of FIG. 3B, the capacitor elements are associated with one of the example first phase 340, the example second phase 345, and the example third phase 350. In the illustrated example of FIG. 3B, the example capacitor ring 230 is connected with the example first phase 340, the example second phase 345, and the example third phase 350 of the example inverter 215 using three pairs (DC+ and DC−) of pressurized connections, one for each phase of the example inverter 215.

Figure 4:
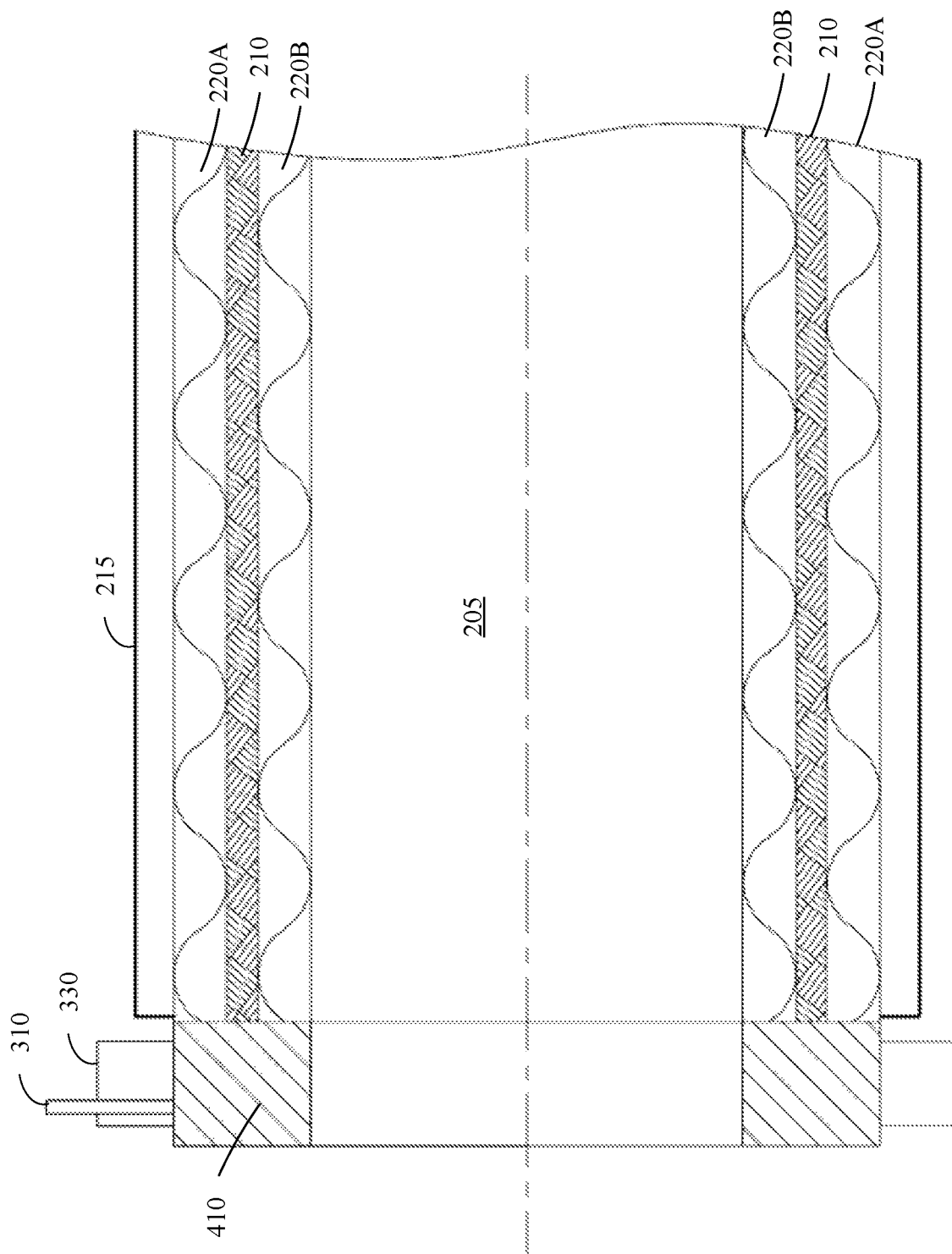
FIG. 4 is close-up, cross-section view of the eDrive system of FIGS. 2A, 2B including an electric motor, an insulating sleeve, an inverter, among other things.

FIG. 4 is a close-up, cross-section view of the example electric motor 205, the example insulating sleeve 210, the example inverter 215, the example coolant channel 220A, the example coolant channel 220B, and the example capacitor ring 230 of FIG. 2A. The illustrated example of FIG. 4 includes the example DC positive power connection 310 and the example capacitor element 330. The illustrated example of FIG. 4 further includes the example capacitor ring layers 410.

In the illustrated example of FIG. 4, the example capacitor ring layer 410 include the example the example insulating ring 305, the example DC positive bus bar 320, and the example DC negative bus bar 325 of the illustrated example of FIGS. 3A, 3B. The illustrated example of FIG. 4 provides a cross-section view of the example capacitor ring 230 of FIGS. 3A, 3B in connection with the example electric drive system 200 of FIG. 2A. The connections between the example capacitor ring 230 and the example inverter 215 are described below in connection with FIG. 7.

Figure 5:
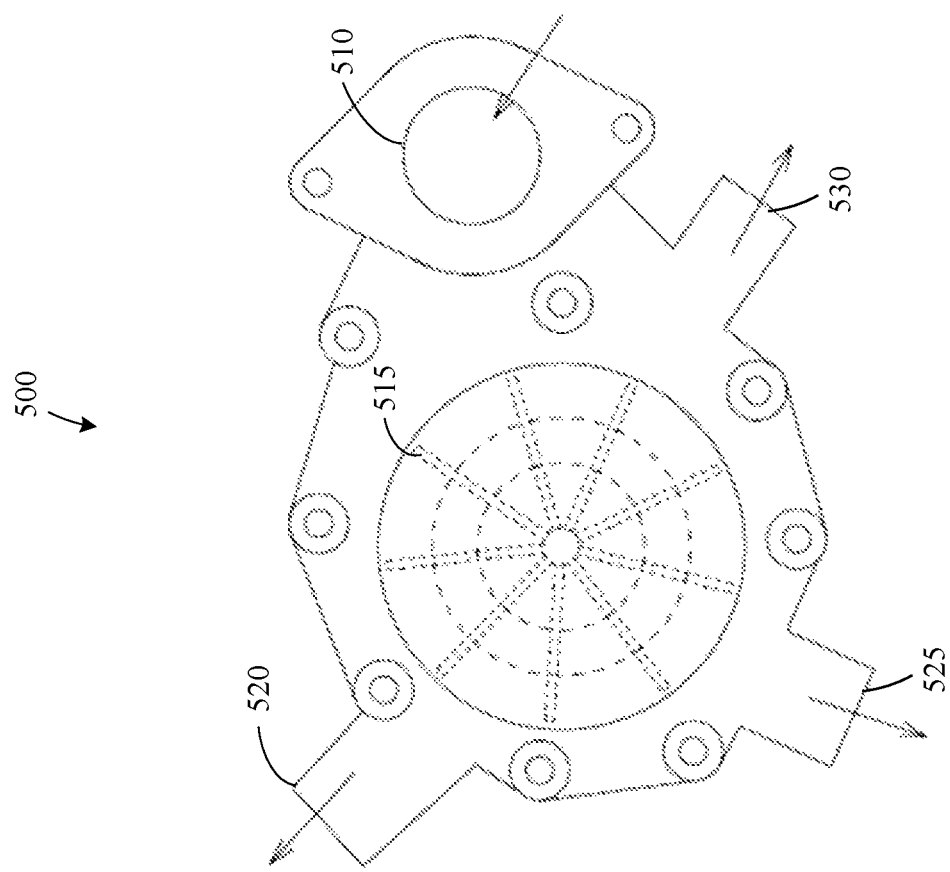
FIG. 5 is a perspective view of the example coolant pump included in the example eDrive systems of FIGS. 2A, 2B.

FIG. 5 is a perspective view of an example coolant pump 500 included in the example electric drive system 200 of FIG. 2A. The example coolant pump 500 is directly driven by electric drive system 200 and forces coolant through three major components of electric drive system 200: the electric motor 205, the inverter 215, and the cooling ring 225. The example coolant pump 500 of FIG. 5 includes an example coolant input port 510, an example blade 515, an example coolant output port 520 to force coolant through inverter, an example coolant output port 525 to force coolant through motor, and an example coolant output port 530 to forces coolant through cooling ring.

The example coolant input port 510 of the illustrated example of FIG. 5 collects coolant from the example radiator 285 of the example electric drive system 200 of FIG. 2A. The example coolant input port 510 receives cooled coolant from the example radiator 285 and provides the cooled coolant to the example coolant pump 500 to be distributed to other components of the example electric drive system 200 of FIG. 2A.

The example blade 515 of the illustrated example of FIG. 5 circulates the cooled coolant from the example coolant input port 510 in the example coolant pump 500. The example blade 515 in the example coolant pump 500 forces the cooled coolant through the inverter, motor, and cooling ring via coolant output ports 520, 525 and 530, respectively. The example blade 515 circulate the coolant by spinning in the example coolant pump 500. The example blade 515 is spun by the example common shaft 275 of the example electric drive system 200 of FIG. 2A. The example coolant pump 500 is not limited to the number of blades illustrated. The example coolant pump 500 can include a plurality of blades with similar features to circulate the cooled coolant from the example coolant input port 510 to the example coolant output ports 520 (for inverter), 525 (for electric motor), and 525 (for cooling ring).

The example coolant output port 520 of the illustrated example of FIG. 5 provides coolant to the example inverter 215 of the example electric drive system 200 of FIG. 2A. The example coolant output port 520 collects cooled coolant from the example coolant pump 500. The example coolant output port 520 provides the collected cooled coolant to the coolant channel for the example inverter 215.

The example coolant output port 525 of the illustrated example of FIG. 5 provides coolant to the example electric motor 205 of the example electric drive system 200 of FIG. 2A. The example coolant output port 525 collects cooled coolant from the example coolant pump 500. The example coolant output port 525 provides the collected cooled coolant to the coolant channel for the example electric motor 205.

The example coolant output port 530 of the illustrated example of FIG. 5 provides coolant to the example cooling ring 225 of the example electric drive system 200 of FIG. 2A. The example coolant output port 530 collects cooled coolant from the example coolant pump 500. The example coolant output port 530 provides the collected cooled coolant to the coolant channel built-in the example cooling ring 225.

Figure 6:
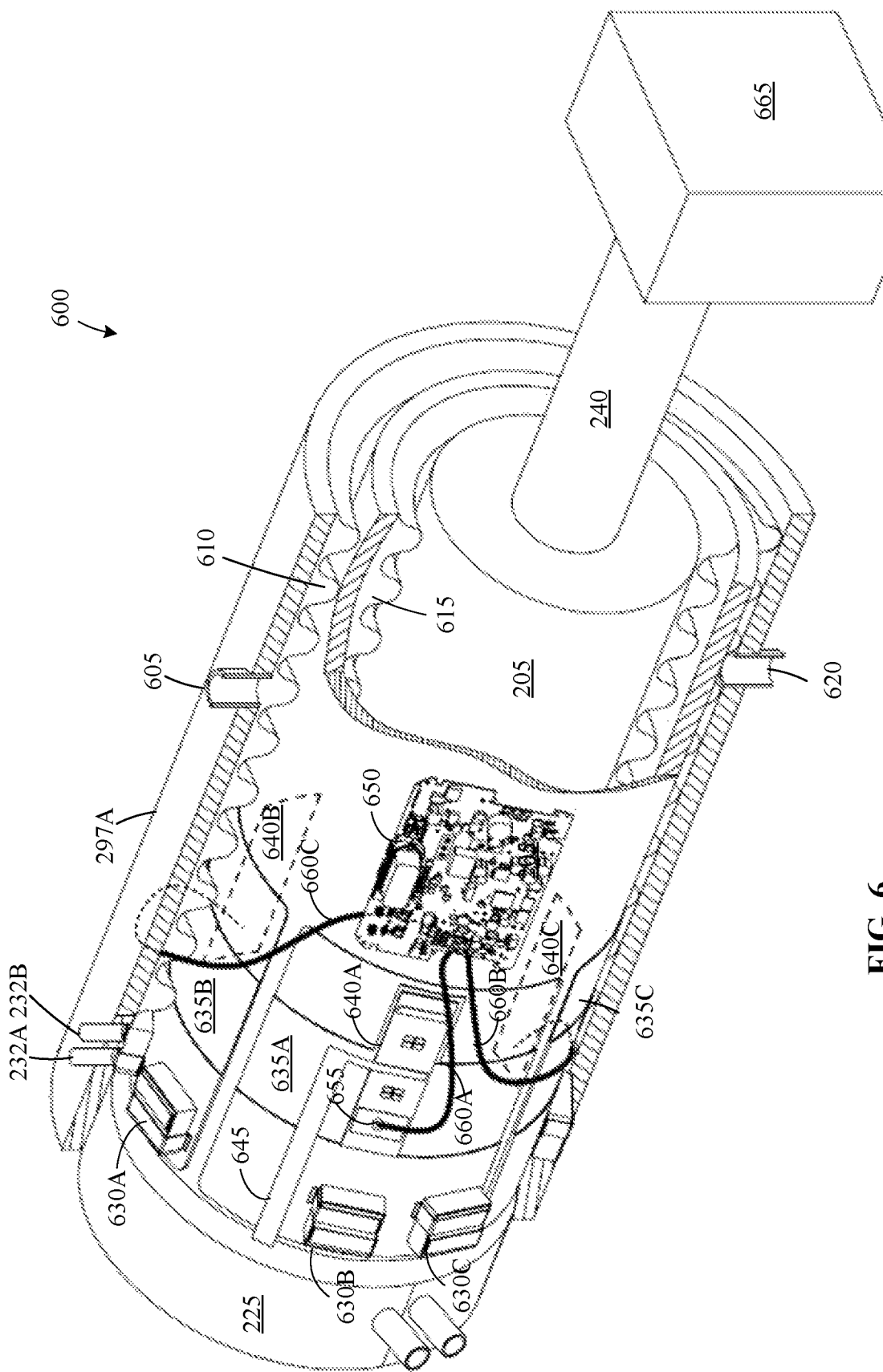
FIG. 6 is a cross-section view of the example heat exchanger system (coolant channel in inverter and eMotor) of the example eDrive system of FIG. 2B.

FIG. 6 is a cross-section view of the example heat exchanger system 600 of the example electric drive system 202 of FIG. 2B. The illustrated example of FIG. 6 is a cross-section view of a serial thermal management system illustrated in the example FIG. 2B. The example heat exchanger system 600 includes the example electric motor 205, the example cooling ring 225, the example power input 232A, 232B, the example motor shaft 240, and only partial view of the example rigid portion of the outer jacket 297A. In the illustrated example of FIG. 6, the example heat exchanger system 600 includes an example coolant inlet 605, an example inverter coolant channel 610, an example electric motor coolant channel 615, an example coolant outlet 620, example capacitor elements 630A, 630B, 630C, example inverter phases 635A, 635B, 635C, example power boards 640A, 640B, 640C, an example power output 645, an example control board 650, an example control input 655, example flying leads 660A, 660B, 660C, and an example gearbox 665.

The example inverter coolant channel 610 of the illustrated example of FIG. 6 provides coolant to the example inverter phases 635A, 635B, 635C. The coolant in the example inverter coolant channel 610 absorbs heat generated by the example inverter phases 635A, 635B, 635C. The example inverter coolant channel 610 obtains the coolant through the example coolant inlet 605. In the illustrated example of FIG. 6, the example inverter coolant channel 610 is coupled to the inner surface of the example inverter phases 635A, 635B, 635C. In some examples, the example inverter coolant channel 610 is similar to the example coolant channel 220B. In some examples, the example coolant inlet 605 is similar to the example coolant channel input 262.

In the illustrated example of FIG. 6, cooled coolant is received at the coolant inlet 605 from the example coolant pump 255. The example coolant flows through the example inverter coolant channel 610. The coolant from the example inverter coolant channel 610 then flows to the coolant channel of the example cooling ring 225. In the illustrated example of FIG. 6, the example coolant flows from the example cooling ring 225 to example electric motor coolant channel 615. In the illustrated example, the coolant from the example electric motor coolant channel 615 is returned to the example radiator 285 through the example coolant outlet 620. The illustrated example of FIG. 6 represents the example serial thermal management system described above in connection with FIG. 2B.

In the illustrated example of FIG. 6, the example electric motor coolant channel 615 provides coolant to the example electric motor 205. The coolant in the example electric motor coolant channel 615 absorbs heat generated by the example electric motor 205. The example electric motor coolant channel 615 obtains the coolant from the coolant channel in the example cooling ring 225. In the illustrated example of FIG. 6, the example electric motor coolant channel 615 is coupled to the outer surface of the example electric motor 205. In the illustrated example of FIG. 6, the example coolant outlet 620 is coupled to the example electric motor coolant channel 615 through an opening in the example inverter 215 and the example electric motor coolant channel 615. In some examples, the example electric motor coolant channel 615 is similar to the example coolant channel 220A.

In the illustrated example of FIG. 6, the example capacitor elements 630A, 630B, 630C generate high-frequency, time-varying power for the example inverter phases 635A, 635B, 635C. In some examples, the example capacitor elements 630A, 630B, 630C are included in the example capacitor ring 230 of FIG. 2B. In some examples, the example inverter phases 635A, 635B, 635C are similar to the example inverter phase 217 of FIG. 2B.

In the illustrated example of FIG. 6, the example inverter phases 635A, 635B, 635C include the example power boards 640A, 640B, 640C. In some examples, the example power boards 640A, 640B, 640C obtains power from the example inverter phases 635A, 635B, 635C. In some examples, the power boards 640A, 640B, 640C obtain the AC power generated by the example inverter phases 635A, 635B, 635C. In some examples, the example power boards 640A, 640B, 640C output the power via an example power output. For examples, the example power board 640A outputs the power from the example inverter phase 635A via the example power output 645. In the illustrated example of FIG. 6, the example power boards 640B and 640C are illustrated using dashed lines to show placement in the example heat exchanger system 600 since they are not visible in the illustrated cross-section view of FIG. 6.

In the illustrated example of FIG. 6, the example control board 650 controls the example power boards 640A, 640B, 640C of the example inverter phases 635A, 635B, 635C. In some examples, the example power boards 640A, 640B, 640C include control inputs. For example, the example power board 640A includes the example control input 655. In some examples, the example control board 650 provides control inputs to the example power boards 640A, 640B, 640C via the example flying leads 660A, 660B, 660C. In the illustrated example of FIG. 6, portions of the example flying leads 660B and 660C are illustrated using dashed lines to show placement in the example heat exchanger system 600 since they are not visible in the illustrated cross-section view of FIG. 6.

In the illustrated example of FIG. 6, the example electric motor 205 is coupled to the example motor shaft 240. The example motor shaft 240 is coupled to the example gearbox 665. In the illustrated example, the gearbox 665 is representative of the example driver gear 245, the example idle (coupling) gear 250, the example load gear 270, and the example common shaft 275 of FIG. 2B.

Figure 7:
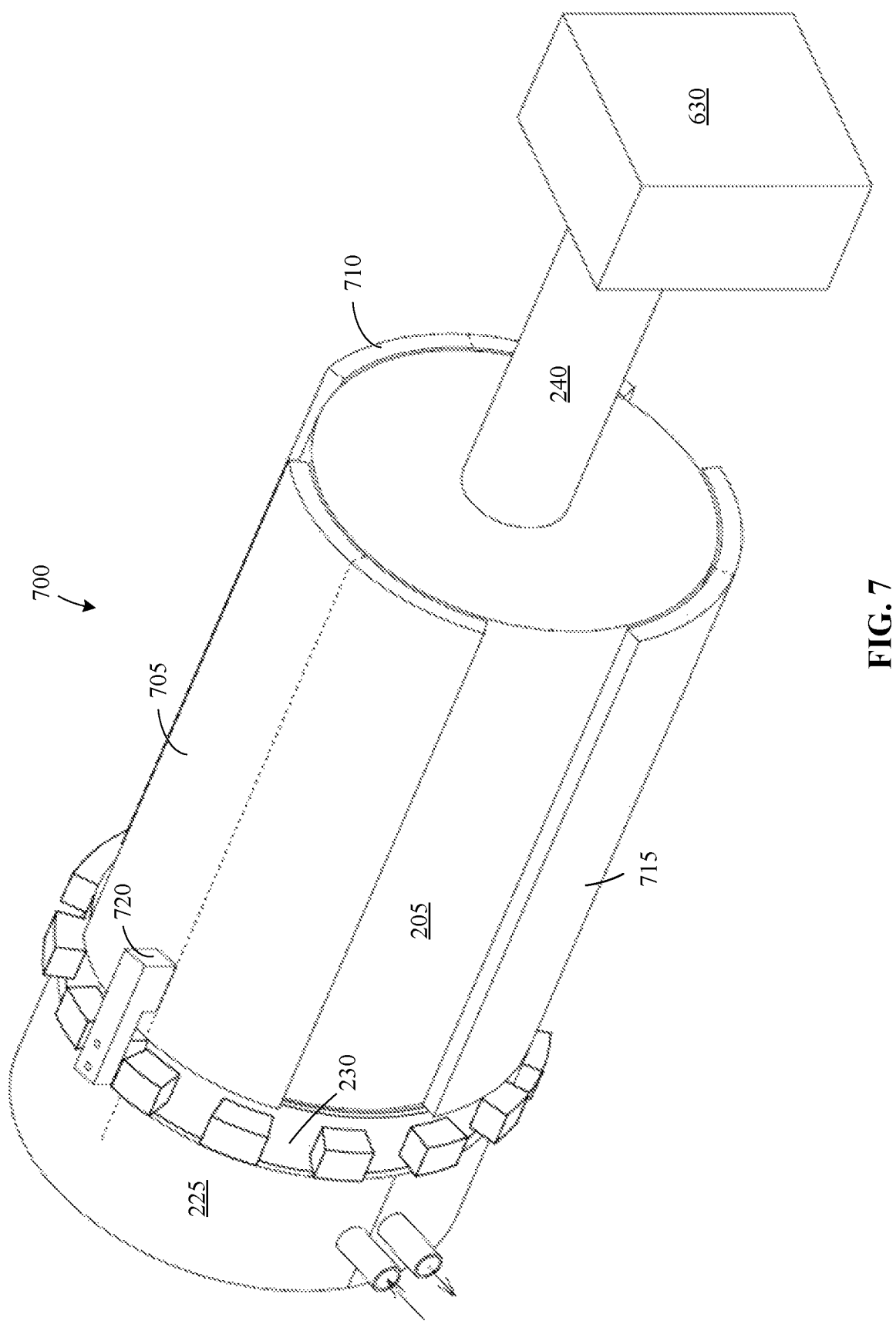
FIG. 7 is a perspective view of an example cooling ring with the example electric motor and the example inverter of FIGS. 2A, 2B.

FIG. 7 is a perspective view of the three phases of the example inverter 215 of the example electric drive system 200 of FIG. 2A. The assembly 700 of FIG. 7 includes the example electric motor 205, the example cooling ring 225, the example capacitor ring 230, the example motor shaft 240, and the example gearbox 630. The illustrated example of FIG. 7 includes an example first inverter phase 705, an example second inverter phase 710, an example third inverter phase 715, and an example pressurized connection 720 between example first inverter phase 705 and example capacitor ring 230.

In the illustrated example of FIG. 7, the first inverter phase 705, the second inverter phase 710, and the third inverter phase 715 are coupled to the electrical output of the example electric motor 205. The example first inverter phase 705 is located one hundred twenty degrees from the example second inverter phase 710 on one side of the first inverter phase 705 and one hundred twenty degree from the example third inverter phase 715 on the other side of the first inverter phase 705. In the illustrated example of FIG. 7, the example second inverter phase 710 is located one hundred twenty degrees clockwise from the example first inverter phase 705, and the third inverter phase 715 is located one hundred twenty degrees counterclockwise from the example first inverter phase 705. The example second inverter phase 710 and the example third inverter phase 715 are also located one hundred twenty degrees from each other on the surface of the example electric motor 205. In the illustrated example of FIG. 7, the first inverter phase 705, the second inverter phase 710, and the third inverter phase 715 are equally spaced around the surface of the example electric motor 205. In some examples, the example first inverter phase 705, the example second inverter phase 710, and the example third inverter phase 715 are substantially similar to the example inverter 215 of the example electric drive system 200 of FIG. 2A. In the illustrated example of FIG. 7, the example first inverter phase 705, the second inverter phase 710, and the third inverter phase 715 are open cylindrical shapes to fit over the cylindrical shape of the example electric motor 205.

In the illustrated example of FIG. 7, the example pressurized connection 720 represents the connection between the example capacitor ring 230 and the example first inverter phase 705. The example pressurized connection 720 includes a pressurized connection for positive DC power and a pressurized connection for negative DC power. In the illustrated example, the second inverter phase 710 and the third inverter phase 715 have connections with the example capacitor ring 230 that are substantially similar to the example pressurized connection 720.

In the illustrated example of FIG. 7, the example cooling ring 225 covers the connection between the example first inverter phase 705 and the example electric motor 205, the connection between the example second inverter phase 710 and the example electric motor 205, and the connection between the example third inverter phase 715 and the example electric motor 205. In the illustrated example, the first inverter phase 705 has a terminal that connects with a first terminal from the example electric motor 205. In the illustrated example, the second inverter phase 710 has a terminal that connects with a second terminal from the example electric motor 205. In the illustrated example, the third inverter phase 715 has a terminal that connects with a third terminal from the example electric motor 205. The connections of the example first inverter phase 705, the example second inverter phase 710, and the example third inverter phase 715 with the example electric motor 205 are described in further detail below in connection with FIG. 8.

Figure 8A:
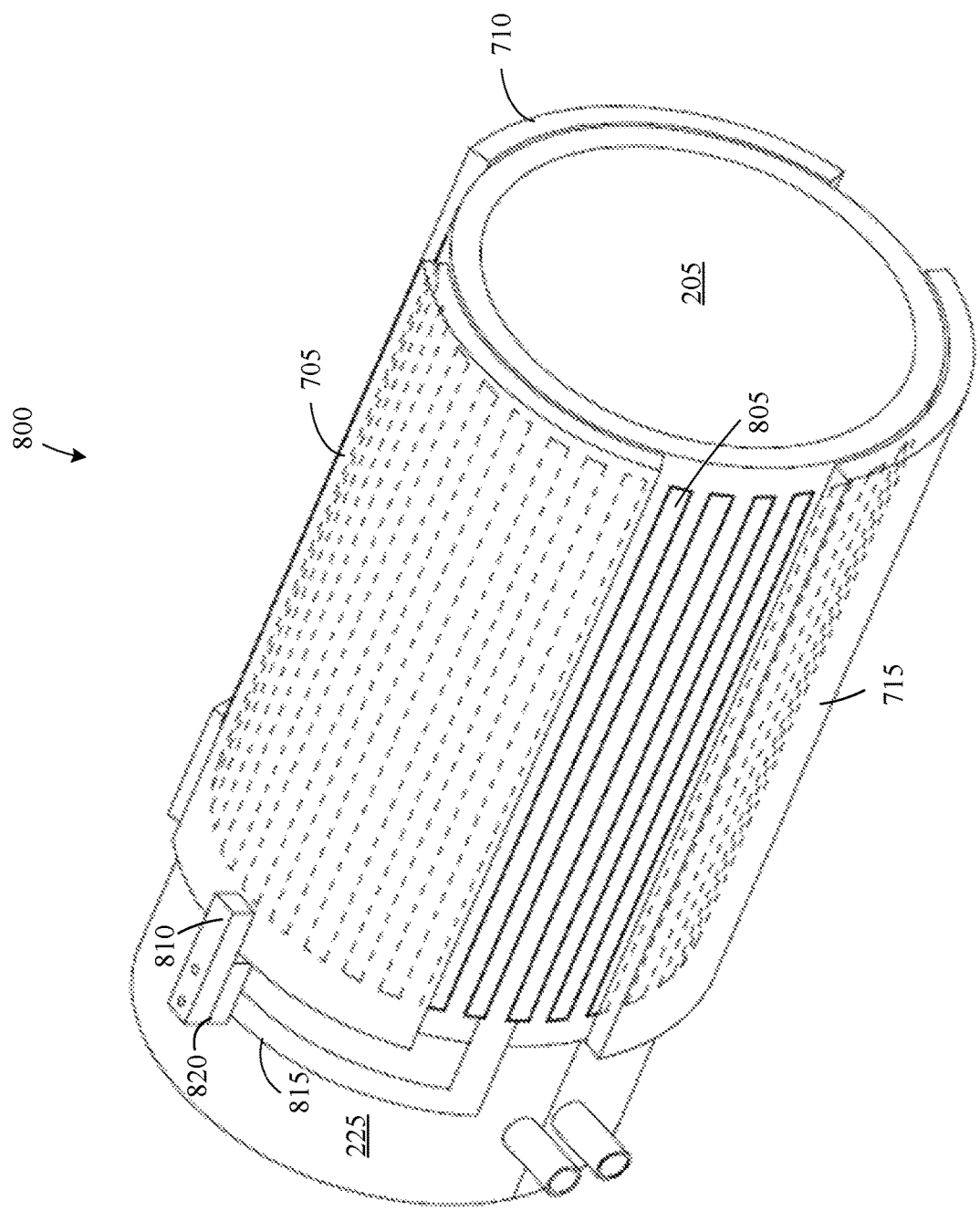
FIGS. 8A, 8B, and 8C are perspective views of example lap joint connections between the example electric motor and the example inverter of FIGS. 2A, 2B.
Figure 8B:
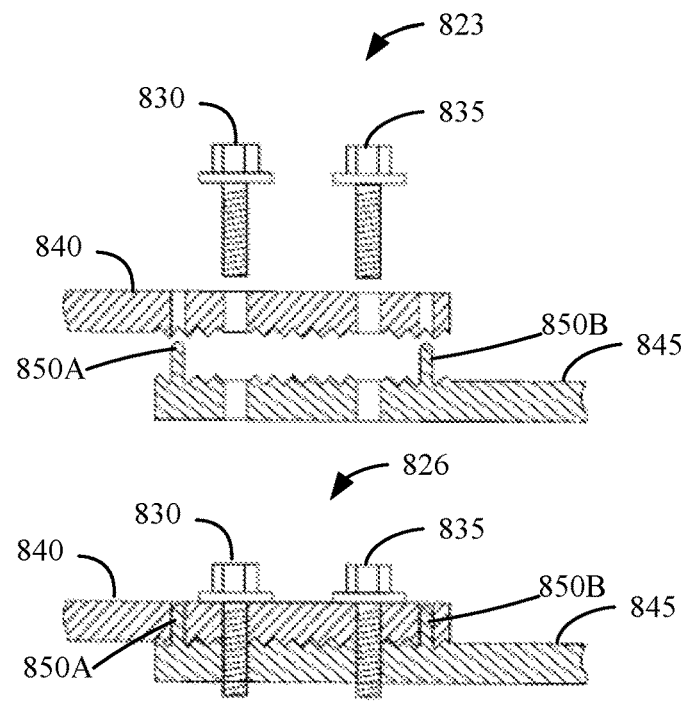
Figure 8C:
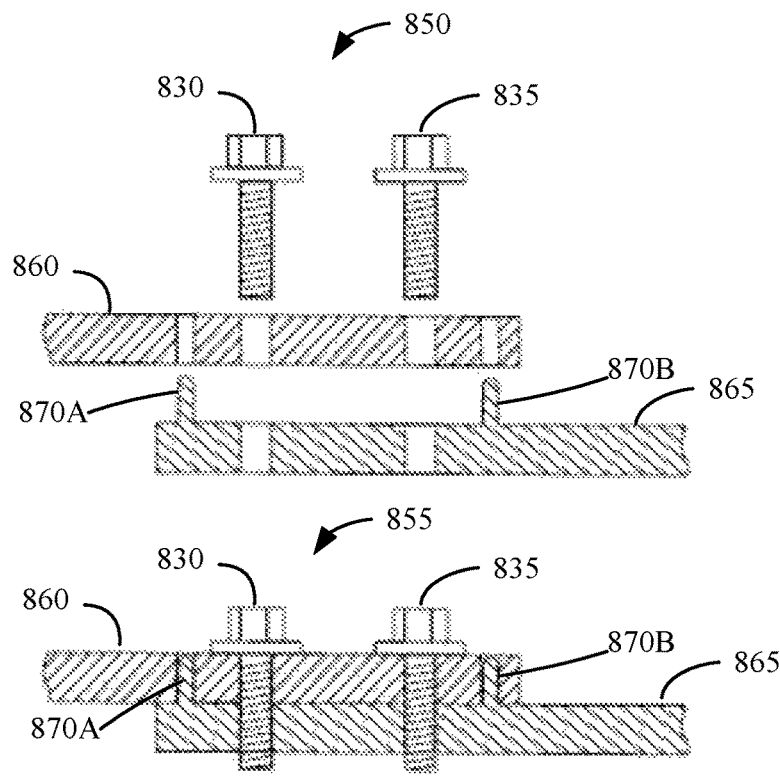

FIGS. 8A, 8B, and 8C are perspective views of example lap joint connections between the example electric motor 205 and the example inverter 215 the example electric drive system 200 of FIG. 2A. The assembly 800 of FIG. 8A includes the example electric motor 205, the example cooling ring 225, the example first inverter phase 705, the example second inverter phase 710, and the example third inverter phase 715. The assembly 800 of FIG. 8A includes example stator windings 805, an example inverter power terminal 810, and example motor power terminal 815, and an example lap joint connection 820.

In the illustrated example of FIG. 8A, the example electric motor 205 includes example stator windings 805 that help to produce a magnetic field for the example electric motor 205. In the illustrated example of FIG. 8A, the stator windings 805 are represented as stator coils placed in stator slots of the example electric motor 205. In some examples, the example stator windings 805 include copper, however, other conductive materials may additionally or alternatively be used including stator body fabricated using 3-D printing technology and magnet wire-based winding placed in uniquely created stator slots using flexibilities of the 3-D printing technology to print metal forms.

In the illustrated example of FIG. 8A, the example first inverter phase 705 is coupled to the example inverter power terminal 810. The example inverter power terminal 810 collects AC power from the example first inverter phase 705. In the illustrated example of FIG. 8A, the example electric motor 205 is coupled to the example motor power terminal 815. The example motor power terminal 815 provides the AC power from the example first inverter phase 705 to the example electric motor 205. In the illustrated example of FIG. 8A, the example inverter power terminal 810 is coupled to the example motor power terminal 815 using the example lap joint 820. The example lap joint 820 is described in further detail below in connection with FIGS. 8B and 8C. In the illustrated example of FIG. 8A, the example second inverter phase 710 and the example third inverter phase 715 include lap joint connections to the example electric motor 205 that are substantially similar to the example lap joint 820.

FIG. 8B is an illustrated example of the lap joint 820 of FIG. 8A. The illustrated example of FIG. 8B includes the example before joining 823 representation and example after joining 826 representation. The illustrated example of FIG. 8B includes example bolts 830, 835, an example inverter power terminal 840, an example motor power terminal 845, and example guiding pins 850A, 850B. In some examples, the example inverter power terminal 840 is substantially similar to the example inverter power terminal 810. In some examples, the example motor power terminal 845 is substantially similar to the example motor power terminal 815.

The illustrated example of FIG. 8B is representative of an example grooved-style lap joint. In the illustrated example of FIG. 8B, the surface of the example inverter power terminal 840 and the surface of the example motor power terminal 845 are grooved. The grooved surfaces of the example inverter power terminal 840 and the example motor power terminal 845 help to increase the surface area of the lap joint connection, resulting in substantial decrease in the electrical resistance for the connection between example inverter power terminal 840 and example motor power terminal 845. In the illustrated example of FIG. 8B, the example motor power terminal 845 includes the example guiding pins 850A, 850B. The example guiding pins 850A, 850B help to align the example inverter power terminal 840 and the example motor power terminal 845. In the illustrated example of FIG. 8B, the example bolts 830, 835 secure the lap joint connection between the example inverter power terminal 840 and the example motor power terminal 845. In the illustrated example of FIG. 8B, the example before joining 823 represents the lap joint between the example inverter power terminal 840 and the example motor power terminal 845 before the connection is made. In the illustrated example of FIG. 8B, the example after joining 826 represents the lap joint between the example inverter power terminal 840 and the example motor power terminal 845 after the connection is made and the example bolts 830, 835 are secured.

FIG. 8C is an alternative example of the lap joint 820 of FIG. 8A. The illustrated example of FIG. 8C includes the example before joining 850 representation and example after joining 855 representation. The illustrated example of FIG. 8C includes the example bolts 830, 835, an example inverter power terminal 860, an example motor power terminal 865, and example guiding pins 870A, 870B. In some examples, the example inverter power terminal 860 is substantially similar to the example inverter power terminal 810. In some examples, the example motor power terminal 865 is substantially similar to the example motor power terminal 815.

The illustrated example of FIG. 8C is representative of an example smooth-style lap joint. In the illustrated example of FIG. 8C, the surface of the example inverter power terminal 860 and the surface of the example motor power terminal 865 are smooth. The smooth surfaces of the example inverter power terminal 860 and the example motor power terminal 865 help make aligning the surfaces for the lap joint connection easier. In the illustrated example of FIG. 8C, the example motor power terminal 865 includes the example guiding pins 870A, 870B. The example guiding pins 870A, 870B help to align the example inverter power terminal 860 and the example motor power terminal 865. In the illustrated example of FIG. 8C, the example bolts 830, 835 secure the lap joint connection between the example inverter power terminal 860 and the example motor power terminal 865. In the illustrated example of FIG. 8C, the example embodiment before joining 850 represents the lap joint between the example inverter power terminal 860 and the example motor power terminal 865 before the connection is made. In the illustrated example of FIG. 8C, the example embodiment after joining 855 represents the lap joint between the example inverter power terminal 860 and the example motor power terminal 865 after the connection is made and the example bolts 830, 835 are secured.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a," "an," "first," "second," etc.) do not exclude a plurality. The term "a" or "an" entity, as used herein, refers to one or more of that entity. The terms "a" (or "an"), "one or more," and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

From the foregoing, it will be appreciated that example methods, apparatus and articles of manufacture have been disclosed for electric drive systems. The disclosed methods, apparatus and articles of manufacture improve the efficiency of electric drive systems.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An electric drive system comprising:
an electric motor including an output shaft to drive an electric vehicle;
power electronics electrically coupled to the electric motor, the power electronics including:
an inverter to supply high-frequency current and voltage to the electric motor, the inverter including a power board, the inverter mounted radially outward from the electric motor; and
a control board to control the inverter using the power board, the power board to supply power to the inverter via a capacitor ring, wherein the inverter and the capacitor ring are electrically coupled via a pressurized connection; and
a thermal management system including an inlet and an outlet coupled to the inverter and to a heat exchanger, the inlet and the outlet positioned on a housing, the housing mounted radially outward from the inverter.

2. The electric drive system of claim 1, wherein the power board is to provide power to the inverter to generate the high-frequency current and voltage, the power including positive and negative direct current power.

3. The electric drive system of claim 1, wherein the inverter includes first inverter phase circuitry, second inverter phase circuitry, and third inverter phase circuitry, wherein the first inverter phase circuitry, the second inverter phase circuitry, and the third inverter phase circuitry are equally spaced radially from each other around the electric motor.

4. The electric drive system of claim 3, wherein the control board includes a first lead, a second lead, and a third lead to supply control inputs to the first inverter phase circuitry, the second inverter phase circuitry, and the third inverter phase circuitry, respectively.

5. The electric drive system of claim 1, wherein the power electronics include a coolant channel coupled to the thermal management system.

6. The electric drive system of claim 1, wherein the capacitor ring comprises a plurality of capacitor elements, an insulating ring, a direct current positive power connection, a direct current negative power connection, a direct current positive bus bar, and a direct current negative bus bar.

7. The electric drive system of claim 6, wherein the direct current positive bus bar and the direct current negative bus bar are flexible, wherein the plurality of capacitor elements are inserted into the direct current positive bus bar and the direct current negative bus bar and the direct current positive bus bar and the direct current negative bus bar are folded into a ring shape, wherein an inner circumference of the ring shape corresponds to an outer circumference of the insulating ring.

8. The electric drive system of claim 1, wherein the pressurized connection includes a pressurized connection pair, wherein the pressurized connection pair includes a pressurized connection for positive direct current voltage and a pressurized connection for negative direct current voltage.

9. The electric drive system of claim 8, wherein the capacitor ring is fastened to the electric motor via a plurality of pairs of pressurized connections, wherein each pair of pressurized connections corresponds to a phase of the inverter.

10. The electric drive system of claim 3, wherein the first inverter phase circuitry, the second inverter phase circuitry, and the third inverter phase circuitry are shaped to fit over a cylindrical shape of the electric motor.

11. The electric drive system of claim 10, wherein the first inverter phase circuitry, the second inverter phase circuitry, and the third inverter phase circuitry are electrically coupled to the electric motor by a lap joint.

12. The electric drive system of claim 11, wherein the lap joint includes bolts, an inverter power terminal, a motor power terminal, and guiding pins, wherein the bolts secure a surface of the inverter power terminal to a surface of the motor power terminal to facilitate electrical connection.

13. The electric drive system of claim 12, wherein the surface of the inverter power terminal and the surface of the motor power terminal include interlocking grooves.

14. The electric drive system of claim 11, wherein the thermal management system includes a cooling ring in contact with the lap joint.

15. The electric drive system of claim 14, wherein the cooling ring of the thermal management system extends circumferentially between the electric motor and the inverter.

16. An electric drive system comprising:
an electric motor including an output shaft to drive an electric vehicle;
power electronics electrically coupled to the electric motor, the power electronics including:
an inverter to supply high-frequency current and voltage to the electric motor, the inverter including a power board; and
a control board to control the inverter using the power board, the power board to supply power to the inverter via a capacitor ring, wherein the inverter and the capacitor ring are electrically coupled via a pressurized connection.

17. The electric drive system of claim 16, wherein the capacitor ring comprises a plurality of capacitor elements, an insulating ring, a direct current positive power connection, a direct current negative power connection, a direct current positive bus bar, and a direct current negative bus bar.

18. The electric drive system of claim 17, wherein the direct current positive bus bar and the direct current negative bus bar are flexible, wherein the plurality of capacitor elements are inserted into the direct current positive bus bar and the direct current negative bus bar and the direct current positive bus bar and the direct current negative bus bar are folded into a ring shape, wherein an inner circumference of the ring shape corresponds to an outer circumference of the insulating ring.

19. The electric drive system of claim 16, wherein the pressurized connection includes a pressurized connection pair, wherein the pressurized connection pair includes a pressurized connection for positive direct current voltage and a pressurized connection for negative direct current voltage.

20. The electric drive system of claim 16, wherein the inverter is electrically coupled to the electric motor by a lap joint, the lap joint in contact with a cooling ring, the cooling ring to extend circumferentially between the electric motor and the inverter.

* * * * *